(12) United States Patent
Beckett et al.

(10) Patent No.: US 9,776,149 B2
(45) Date of Patent: Oct. 3, 2017

(54) COMPOSITIONS AND METHODS FOR PREPARING NANOFORMULATIONS AND SYSTEMS FOR NANO-DELIVERY USING FOCUSED ACOUSTICS

(71) Applicant: Covaris, Inc., Woburn, MA (US)

(72) Inventors: Carl Beckett, Harvard, MA (US); James A. Laugharn, Jr., Winchester, MA (US); Srikanth Kakumanu, North Billerica, MA (US)

(73) Assignee: Covaris, Inc., Woburn, MA (US)

( * ) Notice: Subject to any disclaimer, the term of this patent is extended or adjusted under 35 U.S.C. 154(b) by 236 days.

(21) Appl. No.: 13/724,796

(22) Filed: Dec. 21, 2012

(65) Prior Publication Data

US 2013/0155802 A1 Jun. 20, 2013

Related U.S. Application Data

(63) Continuation of application No. PCT/US2011/001171, filed on Jul. 1, 2011.
(Continued)

(51) Int. Cl.
*B01J 2/18* (2006.01)
*B01F 11/02* (2006.01)
*B01F 3/08* (2006.01)

(52) U.S. Cl.
CPC .......... *B01F 11/0283* (2013.01); *B01J 2/18* (2013.01); *B01F 3/0807* (2013.01);
(Continued)

(58) Field of Classification Search
CPC ....................................................... B01J 2/18
See application file for complete search history.

(56) References Cited

U.S. PATENT DOCUMENTS

| 1,734,975 A | 11/1929 | Loomis et al. |
| 4,452,747 A * | 6/1984 | Gersonde ............. A61K 9/1277 264/4.1 |
| 6,719,449 B1 | 4/2004 | Laugharn, Jr. et al. |
| 6,948,843 B2 | 9/2005 | Laugharn, Jr. et al. |

FOREIGN PATENT DOCUMENTS

| AU | WO 2009067734 A1 * | 6/2009 | ........... A61K 9/1075 |
| EP | 1925359 A1 | 5/2008 | |

(Continued)

OTHER PUBLICATIONS

International Preliminary Report on Patentability in PCT/US2011/001171, Mailed Jan. 27, 2013.

(Continued)

*Primary Examiner* — Benjamin Packard
(74) *Attorney, Agent, or Firm* — Wolf, Greenfield & Sacks, P.C.

(57) ABSTRACT

Focused ultrasonic acoustic processing is used to prepare formulations particles ranging between approximately 10 nm and approximately 50 microns (e.g., between 1 micron and 20 microns), or between approximately 10 nm approximately 400 nm (e.g., between 10 nm and 100 nm). Formulations (e.g., nanoformulations) may include a suspension (e.g., nanosuspension), an emulsion (e.g., nanoemulsion) or another small particle system. Formulations may be used as delivery systems for therapeutic agents, e.g., a formulation may include a bioactive agent and a carrier compound such as a surfactant that encapsulates the bioactive agent.

31 Claims, 17 Drawing Sheets

Related U.S. Application Data

(60) Provisional application No. 61/360,700, filed on Jul. 1, 2010, provisional application No. 61/434,941, filed on Jan. 21, 2011.

(52) U.S. Cl.
CPC .......... *B01F 2215/0431* (2013.01); *B01F 2215/0454* (2013.01); *B01F 2215/0477* (2013.01); *B01J 2219/00932* (2013.01)

(56) References Cited

FOREIGN PATENT DOCUMENTS

| JP | 2007515392 | 6/2007 |
| JP | 2007516067 | 6/2007 |
| JP | 2007533647 A | 11/2007 |
| JP | 2009518289 A | 5/2009 |

OTHER PUBLICATIONS

Office Action dated Mar. 12, 2015 from corresponding Japanese Application No. 2012-518374.
Office Action dated Nov. 13, 2014 from corresponding European Patent Application No. 11738844.7.
Zou, J. et al., "Internalization of liposome nanoparticles functionalized with TrkB ligand in rat cochlear cell populations," European Journal of Nanomedicine, 2008, pp. 8-13, vol. 3.
Office Action dated Aug. 14, 2015 from corresponding Japanese Patent Application No. 2013-518374.

\* cited by examiner

COMPOSITIONS AND METHODS FOR PREPARING NANOFORMULATIONS AND SYSTEMS FOR NANO-DELIVERY USING FOCUSED ACOUSTICS

This application is a continuation of PCT Patent application PCT/US2011/001171, filed Jul. 1, 2011, which claims the benefit of U.S. Provisional application Nos. 61/434,941, filed Jan. 21, 2011 and 61/360,700, filed Jul. 1, 2010. These applications are hereby incorporated by reference in their entirety.

BACKGROUND

1. Field of Invention

Aspects described herein relate to the use of focused acoustic energy to prepare formulations (e.g., nanoformulations) and/or systems for nano-delivery. In some cases, nano-delivery systems discussed herein may have application in fields related to the delivery of bioactive agents.

2. Related Art

Acoustic treatment systems can be used to expose samples to an acoustic field. Samples that may undergo acoustic treatment include genetic material (e.g., DNA, RNA), tissue material (e.g., bone, connective tissue, vascular tissue), plant material (e.g., leaves, seeds), cells and other substances. Acoustic treatment systems may be used to treat biological and/or non-biological items. In some arrangements, the acoustic energy can be relatively intense, causing the sample material to be fragmented, lysed, or otherwise disrupted. For example, a sample containing a plurality of cells may be exposed to acoustic treatment such that cell membranes and other components are broken down or otherwise degraded so that DNA or other genetic material is released into a liquid. The genetic material may then be collected and used for various types of analyses. Acoustic treatment systems generate a suitable acoustic field for these processes using an acoustic transducer. The acoustic field may be focused or otherwise arranged so as to cause the desired effect on the sample material. Examples of such systems are described in U.S. Pat. Nos. 6,948,843; 6,719,449; 7,521,023; and 7,687,026.

SUMMARY

Aspects described herein relate to compositions and methods for preparing nanoformulations using focused ultrasonic acoustic processing. In preparing a nanoformulation, focused ultrasonic acoustical energy may be applied to a mixture having at least two different compositions to form a tight distribution of very small particles (e.g., having a low polydispersity index). In some cases, such small particles have micron or nanometer-sized (submicron) features. Nanoformulations as discussed herein may include microparticles and/or nanoparticles in a suspension (e.g., nanosuspension), an emulsion (e.g., nanoemulsion) or another system that includes small particles. In some embodiments, though not required, nanoformulations may be used as nano-sized delivery systems for bioactive agents, such as pharmaceuticals and/or other therapeutic compounds. For example, a nanoformulation may include a compound such as a pharmaceutical, nutraceutical and/or cosmeceutical. A nanoformulation may include a suspension of micron or submicron sized particles dispersed within a solvent. Alternatively, a nanoformulation may include a bioactive agent and a carrier compound such as a surfactant that encapsulates the bioactive agent, such as a drug incorporated within a liposome.

In preparing a nanoformulation, a mixture having two different compositions may be placed in a vessel and exposed to a focal zone of acoustic energy having a size of less than 2 centimeters. The focused acoustic field may be generated from an acoustic energy source operated at a suitable power level for a certain period of time such that upon sufficient exposure of the mixture to the focal zone of the acoustic field, a nanoformulation having a plurality of particles with an average size between about 10 nm and about 50 microns and having relatively tight distribution may result. In some cases, the average particle size within the mixture prior to the mixture being subject to focused acoustic treatment is over 100 microns, or over 200 microns. Depending on how the mixture is processed, the resulting average particle size may be less than 10 microns, less than 1 micron, between 100 nm and 1 micron or between 10 nm and 100 nm. In some embodiments, the resulting average particle size ranges between 10 nm and 400 nm.

In some embodiments, a mixture having multiple compositions and an initial average particle size distribution may be treated with focused acoustic energy in a manner that reduces the average particle size of the mixture and/or otherwise results in a particle size distribution that is unimodal and has a low polydispersity index. Though, particle size reduction and/or preparation of a certain particle size distribution in a mixture, while advantageous in some instances, is not a required aspect of the present disclosure. In some embodiments, a mixture having multiple compositions may be suitably processed in accordance with focused acoustic methods such that the average particle size of the mixture is not reduced, but rather particles within a desired size range are assembled or otherwise formed.

In an illustrative embodiment, a method of preparing a nanoformulation is provided. The method includes providing a mixture in a vessel, the mixture comprising a first composition and a second composition; transmitting focused acoustic energy having a frequency of between about 100 kilohertz and about 100 megahertz and a focal zone having a size of less than about 2 centimeters through a wall of the vessel such that the mixture is disposed at least partially in the focal zone; and forming a plurality of particles in the mixture by, at least in part, exposure of the mixture to the focal zone for a period of time, the plurality of particles having an average size of between approximately 10 nm and approximately 50 microns after exposure of the mixture to the focal zone for the period of time.

In another illustrative embodiment, a system for preparing a nanoformulation is provided. The system includes a vessel; a mixture comprising a first composition and a second composition, the mixture disposed in the vessel; and an acoustic energy source spaced from and exterior to the vessel and adapted to emit focused acoustic energy having a frequency of between about 100 kHz and about 100 MHz and a focal zone having a size of less than about 2 cm through a wall of the vessel such that the mixture is disposed at least partially in the focal zone, wherein, upon exposure of the mixture to the focal zone for a time period, the mixture comprises a plurality of particles having an average size of between approximately 10 nm and approximately 50 microns.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
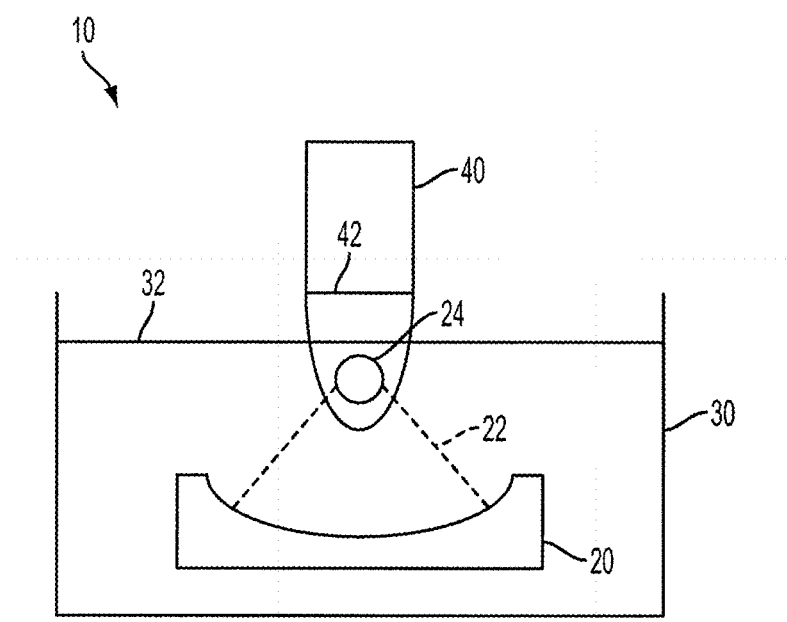
FIG. 1 shows a schematic diagram of an acoustic treatment system in accordance with an illustrative embodiment.

The present disclosure relates to systems and methods that utilize focused acoustics for preparing nanoformulations having a desired particle size distribution with a narrow distribution while also being repeatable, controllable, yields results quickly, avoids cross-contamination of sample material, and is isothermal (i.e., avoids over-heating of the sample). Such nanoformulations and the ability to create them in a simple, convenient manner may be useful for furthering existing methods of therapeutic delivery as well as preparing systems for therapeutic delivery. Suitable nanoformulations may include particles in a suspension, an emulsion or a different small particle system. In some cases, nanoformulations may be used for delivering a therapeutic agent. Examples of nanoformulations provided herein include suspensions of micron or submicron sized particles dispersed within a solvent, or a bioactive agent disposed in a carrier composition (e.g., liposomes in a carrier). As described herein, a nanoformulation may be considered to be a formulation that includes submicron sized particles.

Nanoformulations produced in accordance with methods described may include a mixture having an average particle size between about 10 nm and about 50 microns, or in some cases between about 10 nm and about 400 nm. In some embodiments, the particle size distribution is relatively tight, for example, having a polydispersity index of less than 0.1. In some embodiments, nanoformulations may be prepared by subjecting a mixture having multiple compositions to focused acoustic energy in a manner that reduces the average particle size of the mixture and/or otherwise processes the mixture (e.g., by liposome formation) to result in a unimodal particle size distribution having a low polydispersity index. In other embodiments, nanoformulations may be prepared by applying focused acoustic energy to a mixture in a manner that does not significantly reduce the average particle size of the mixture, but rather forms particles in a desired size range by assembling components together, such as in the formation of a liposome.

The inventors have recognized and appreciated that a substantial amount of chemical compositions produced by the pharmaceutical industry, with a number of existing drugs currently on the market, are lipophilic (poorly soluble) compounds. As a result of such poor solubility, pharmaceutical agents tend to exhibit a short biological half-life, poor bioavailability, prominent adverse effects and an overall decreased stability. It then follows that to evaluate such compositions at the preclinical stage, the composition is often dosed orally as an aqueous-based suspension. A downside to dosing an aqueous-based suspension is that detrimental in vivo consequences may arise, such as decreased bioavailability and higher inter-subject variability, as compared to dosing with a solution formulation. A solution formulation, in contrast, is not easily attainable using conventional methods without either toxic levels of excipients and/or considerable resources expended, thus making early stage evaluation of a high number of compounds impractical.

Producing suspensions with a desired (and relatively small) particle size may help to mitigate the aforementioned problems. The inventors have recognized and appreciated that conventional methods of quickly and conveniently forming suspensions with a desired particle size across a range of sample volumes and concentrations without contamination (e.g., resulting from repeated usage of a reusable probe) or degradation (e.g., due to excessive heating) are less than ideal. Traditional methods generally produce a broad particle size distribution (e.g., high polydispersity index) as opposed to a tight, narrow particle size distribution (e.g., low polydispersity index). Conventional processes to formulate a simple suspension for preclinical oral dosing include sonication, homogenization, microfluidization, stirring and/or the use of excipients such as surfactant wetting agents or polymers for promoting homogeneity.

Mechanical homogenization has not been found to be ideal for producing suspensions as the technique promotes foaming in the formulation and does not provide a method for mitigating cross-contamination. In addition, microfluidization has a tendency to produce very large amounts of heat in addition to permitting cross-contamination in the processing chamber. Other disadvantages to microfluidization include that the sample must be cooled with a heat exchanger after processing and that the sample must frequently pass through a microfluidizing system multiple times, rendering the sample material not fully recoverable. Milling of compounds prior to formulation, as an additional step, adds more time to the overall process and, by virtue of the requirement that more steps are performed, introduces an greater loss of yield.

Although ultrasonics have been utilized for a variety of diagnostic, therapeutic, and research purposes, the biophysical, chemical, and mechanical effects are generally only empirically understood. Some uses of sonic or acoustic energy in materials processing include "sonication," which is an unrefined process of mechanical disruption involving the direct immersion of an unfocused ultrasound source emitting energy in the low kilohertz (kHz) range (e.g., 15 kHz) into a fluid suspension of the material being treated. Accordingly, the sonic energy produces inconsistent results due to the unfocused and random nature of the acoustic waves and are prone to induce sample overheating, as the energy is scattered, absorbed and/or not properly aligned with the target.

In contrast to prior uses of sonic energy, the use of "focused acoustics" as described herein in the preparation of a nanoformulation has significant benefits, including those listed below. Focused acoustics provides a distinct benefit in that it allows for the creation of a nanoformulation having a desired particle size distribution (e.g., having a suitable range of particle size with a narrow unimodal distribution). Focused acoustics also provides for the processing and creation of nanoformulations with little or no heating of the sample during acoustic processing (i.e., providing an isothermal treatment). Compositions may be processed in a contained environment, i.e., a closed system, enabling sterile non-contact operation without risk of contamination. The end recovery yield is drastically increased (e.g., 100% material recovery) as compared with conventional methods of preparing nanoformulations, such milling, microfluidization, homogenization, etc. Focused acoustics treatment is highly scalable between small (e.g., less than 10 mL) and large (e.g., greater than 250 mL) processing volumes. Focused acoustics may be used to prepare nanoformulations having a broad range of concentrations where essentially the same treatment result occurs for different mixtures having widely different concentrations of a particular composition within the mixture (e.g., results may be similar upon focused acoustic treatment of different mixtures having concentrations as low as 1 mg/mL and as high as 100 mg/mL). Focused acoustic methods described herein may also involve a simple process operation that requires less operator labor, and a lower operator skill set than that required of conventional sonication or methods of preparing nanoformulations. Nanoformulations using focused acoustical methods discussed herein may exhibit a prolonged shelf life with little or no degradation of an active ingredient (e.g., therapeutic agent) that may otherwise occur in conventional processes of forming the nanoformulation. Focused acoustics enables the ability to use a wide range of surfactants and a dispersion medium within the mixture; as well as the ability to use mixtures having low concentrations, or possibly eliminating the use altogether, of surfactants and dispersion mediums. Further, focused acoustic energy may be used to lyse cells and thus kill bacteria and viruses, thus providing a method of sterilizing the composition of interest. Focused acoustics may be used in accordance with adaptive focused acoustics (AFA) methods provided by Covaris, Inc, Woburn, Mass.

Systems and methods presented herein utilize focused acoustics for controllably, quickly and conveniently preparing nanoformulations having a small particle size with a tight distribution, while avoiding disadvantages such as sample contamination and overheating. In some embodiments, nanoformulations may be prepared by subjecting a mixture of compositions to a focal zone of acoustic energy under suitable conditions so as to form particles having an average size of between approximately 10 nm and approximately 50 microns (e.g., between 20 nm and 100 nm, between 100 nm and 1 micron, between 1 micron and 20 microns). In some cases, exposing the mixture of compositions to the focused acoustic energy under certain conditions will substantially reduce the average size of particles in the mixture. In some situations, preparing a nanoformulation via focused acoustic treatment of a mixture of compositions may involve the production of small particles having a tight distribution without a substantial size reduction of pre-existing particles within the mixture.

Particle size distributions of mixtures and/or nanoformulations described herein may be measured using dynamic laser light scattering, also called Photon correlation spectroscopy (e.g., using Malvern Zetasizer-S, Zetasizer Nano ZS-90 or Mastersizer 2000 instruments; Malvern Instruments Inc.; Southborough Mass.). The Malvern Zetasizer-S instrument was used to estimate average particle sizes with a 4 mW He—Ne laser operating at a wavelength of 633 nm and an avalanche photodiode detector (APD). The average size of particles in a mixture may be estimated as the mean hydrodynamic size. The particle size distribution may be estimated according to polydispersity index (PDI), which is known in the art as a measure of the tightness of a distribution. The average size of particles and the PDI of mixtures and nanoformulations discussed herein are calculated according to the International Standard on dynamic light scattering, ISO 13321.

Particles of nanoformulations may have any three dimensional shape, such as a sphere, cuboid, parallelepiped, hexahedron, polyhedron, etc. It can be appreciated that the term "particle size," as used herein, may refer to an estimated particle size as assessed by methods known in the art. For example, particle size may refer to an estimated diameter of a particle assuming a generally spherical shape. Or, particle size may refer to an estimated width, length or other dimension of a polyhedron, such as a cuboid.

Focused acoustic treatment processes may be scaled up in accordance with systems and methods provided herein. In some embodiments, a treatment vessel may have one or more suitable inlets and/or outlets that permit sample material to flow into and out of the vessel. Once suitably disposed in the vessel, the sample material may be subject to focused acoustic treatment under an appropriate set of conditions. After a sufficient degree of focused acoustic treatment, the sample material may be discharged from the vessel, allowing more sample that had not been previously treated to be subject to focused acoustic treatment. For various embodiments described herein, a treatment vessel may be considered to be equivalent to a process chamber.

In some embodiments, an acoustic treatment system may include a reservoir and a process chamber, each having inlets and outlets that are in fluid communication with one another; that is, fluid is permitted to travel between the reservoir and the process chamber via suitable conduits. Accordingly, sample material from the reservoir may be caused to travel to the process chamber for focused acoustic treatment under appropriate conditions and may subsequently be caused to travel back to the reservoir. As a result, sample material may be acoustically processed in a cyclic fashion where portions of sample material may receive focused acoustic treatment multiple times.

In some embodiments, sample material may travel from a supply reservoir to a process chamber for focused acoustic treatment. The treated sample material may subsequently travel from the process chamber to a different container separate from the supply reservoir.

In some embodiments, sample material may travel from a supply reservoir through multiple process chambers for varying levels of processing, such as different conditions of focused acoustics. Additional conduits may also be provided for the addition/removal of sample material.

FIG. 1 illustrates a focused acoustic processing system 10 in accordance with systems described in U.S. Pat. Nos. 6,948,843; 6,719,449; and 7,521,023. The system utilizes a piezoelectric transducer 20 to generate acoustic energy waves 22 directed toward a sample 42 that is contained within space defined by a vessel 40. The vessel 40 is positioned within a fluid bath container 30 having an acoustic coupling medium 32 (e.g., water) located therein and in contact with an exterior surface of the vessel. Acoustic energy waves 22 are transmitted from the transducer 20, through the medium 32, through a wall of the vessel 40 and converge in a focal zone 24 within or near the walls of the vessel. The frequency of the acoustic waves may have any suitable range, such as between about 100 kilohertz and about 100 megahertz, or between about 500 kilohertz and about 10 megahertz. The focal zone 24 is in close proximity to the sample 42 such that non-contact isothermal mechanical energy is applied to the sample 42. The focal zone may have any suitable shape and size, such as having a width (e.g., diameter) of less than about 2 cm.

Figure 2:
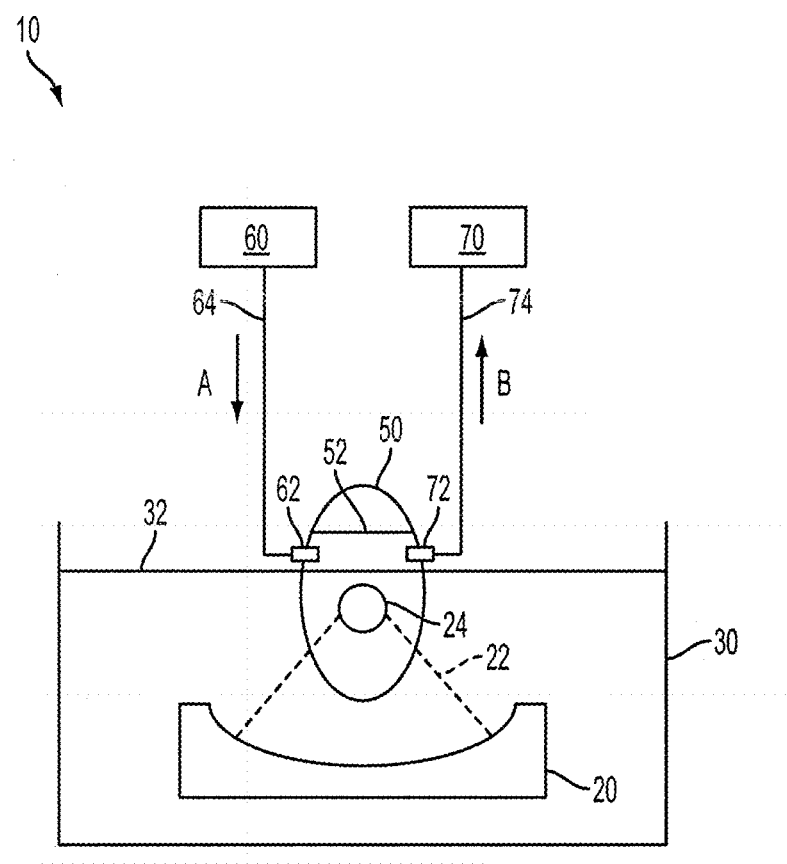
FIG. 2 illustrates a schematic diagram of another acoustic treatment system in accordance with an illustrative embodiment.

The inventors have recognized and appreciated that it would be advantageous for treatment processes of sample material with focused acoustic systems to be scaled up for treatment of larger volumes of material. Although the system of FIG. 1 may incorporate mechanical and/or electrical mechanisms that allow for relative movement between a transducer and a vessel, the sample material is generally contained within the space defined by the vessel 40. As such, to treat subsequent sample material, the transducer and/or the vessel should be displaced. FIG. 2 depicts an acoustic processing system 10 that allows for inflow and outflow of sample material without need for the transducer 20 or the vessel 50 to be moved. The system of FIG. 2 is similar to that system shown in FIG. 1 including a vessel 50 having sample material 52 disposed therein; however, the system also includes a sample source 60 and a sample drain 70. The vessel 50 includes an inlet 62 in fluid communication with a conduit 64 for permitting an inflow of sample material from the source 60 through conduit 64 along the direction of arrow A and into the vessel 50. The vessel also includes an outlet 72 that permits an outflow of sample material from the vessel and into a conduit 74 along the direction of arrow B that provides for fluid flow of sample material to the drain 70. Accordingly, this system provides the ability for untreated sample material to travel into the vessel, be treated with focused acoustic energy and subsequently travel out of the vessel, allowing for more sample material to be treated with focused acoustics while not requiring movement of the vessel or the transducer relative to one another.

Figure 3:
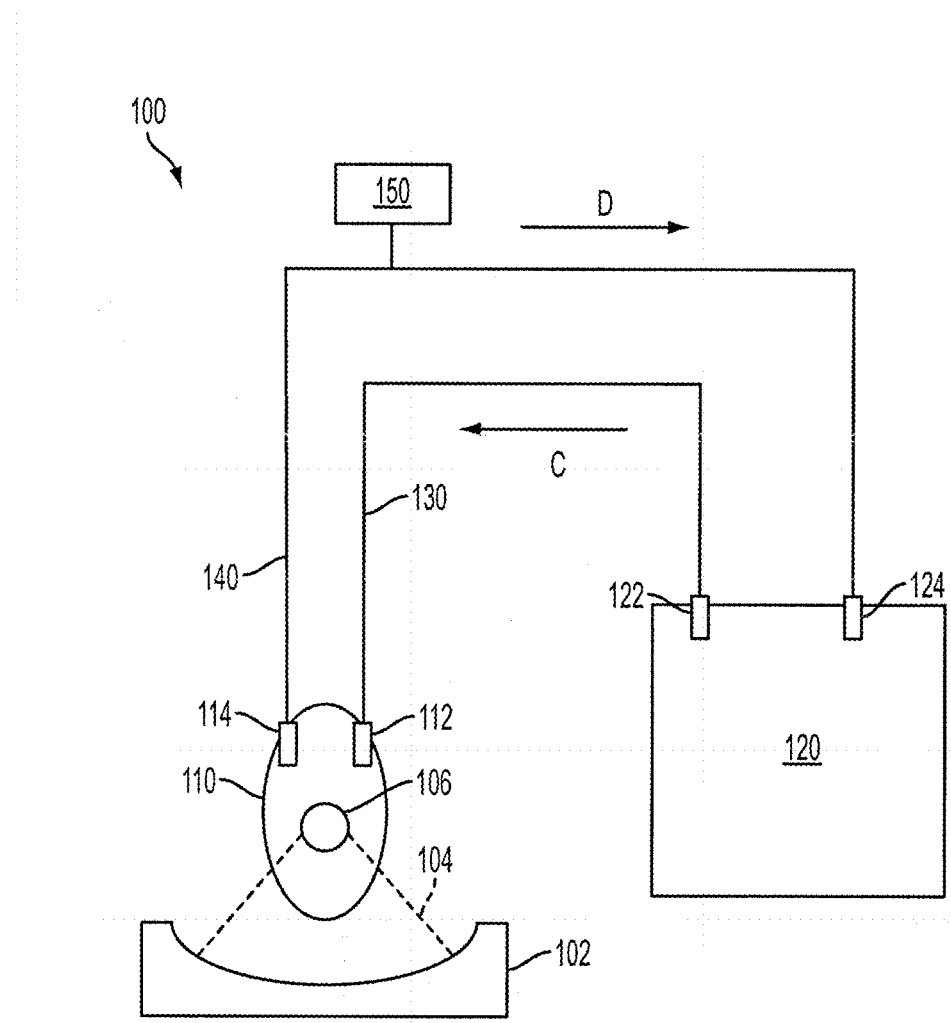
FIG. 3 depicts a schematic diagram of a further acoustic treatment system in accordance with an illustrative embodiment.

FIG. 3 depicts another illustrative embodiment of a focused acoustic processing system 100 that enables a scaled up approach for treating sample material with focused acoustics. The system also provides for the ability for sample material to be treated multiple times. The system includes a reservoir 120 for holding a supply of sample material and a process chamber 110 which provides a space for sample material to undergo acoustic treatment. The reservoir 120 includes a reservoir outlet 122 and a reservoir inlet 124 for permitting inflow and outflow of sample material to and from the reservoir. Similarly, the process chamber 110 includes a chamber inlet 112 and a chamber outlet 114 for permitting inflow and outflow of sample material to and from the process chamber. The reservoir outlet 122 permits sample material to travel along the direction of arrow C from the reservoir into a conduit 130 and further into the process chamber via chamber inlet 112. Upon sufficient acoustic treatment of the sample material, an appropriate amount of sample material may exit from the process chamber via chamber outlet 114, into a conduit 140 so as to travel along the direction of arrow D and back into the reservoir 120 via reservoir inlet 124.

Accordingly, a larger amount of sample material may be acoustically treated than the volume which is defined by the space of the process chamber. In addition, sample material may be acoustically treated multiple times as already-processed material that is transported back into the reservoir from the process chamber may ultimately be caused to move from the reservoir back into the process chamber for further acoustic treatment.

Any suitable structure may be provided as an inlet and/or outlet, as described herein. For example, appropriate inlets and outlets may include a nozzle, hole, tubing, conduit, etc. In some cases, inlets and/or outlets may include a valved structure that opens and closes to control inflow and outflow of material when desired. In addition, the process chamber and reservoir are not limited in the number and location of inlets/outlets. For example, the process chamber and/or reservoir may have an additional inlet or outlet for flow of sample material to other suitable locations beside conduits 130, 140.

Any suitable motive force may be provided for causing movement of sample material between the reservoir and the process chamber (e.g., through conduits 130, 140 and respective inlets/outlets). In some embodiments, a pump 150 is provided to apply pressure to the sample material for moving the sample material from the reservoir to the process chamber and back. Any appropriate pumping device may be utilized. In some cases, the pump is coupled to a conduit, such as the coupling shown in FIG. 3 between conduit 140 and pump 150. One or more suitable pumps may be provided at any appropriate location of the system. In some embodiments, without need for a pumping device, a differential pressure gradient is provided between various regions of the system. For example, a pressure gradient may be maintained along conduit 130 so as to cause flow of sample material from the reservoir through the reservoir outlet 122 and into the process chamber via the chamber inlet 112. Similarly, a pressure gradient may also be maintained along conduit 140 which causes flow of sample material from the process chamber through the chamber outlet 114 through conduit 140 and into the reservoir via the reservoir inlet 124.

Figure 4:
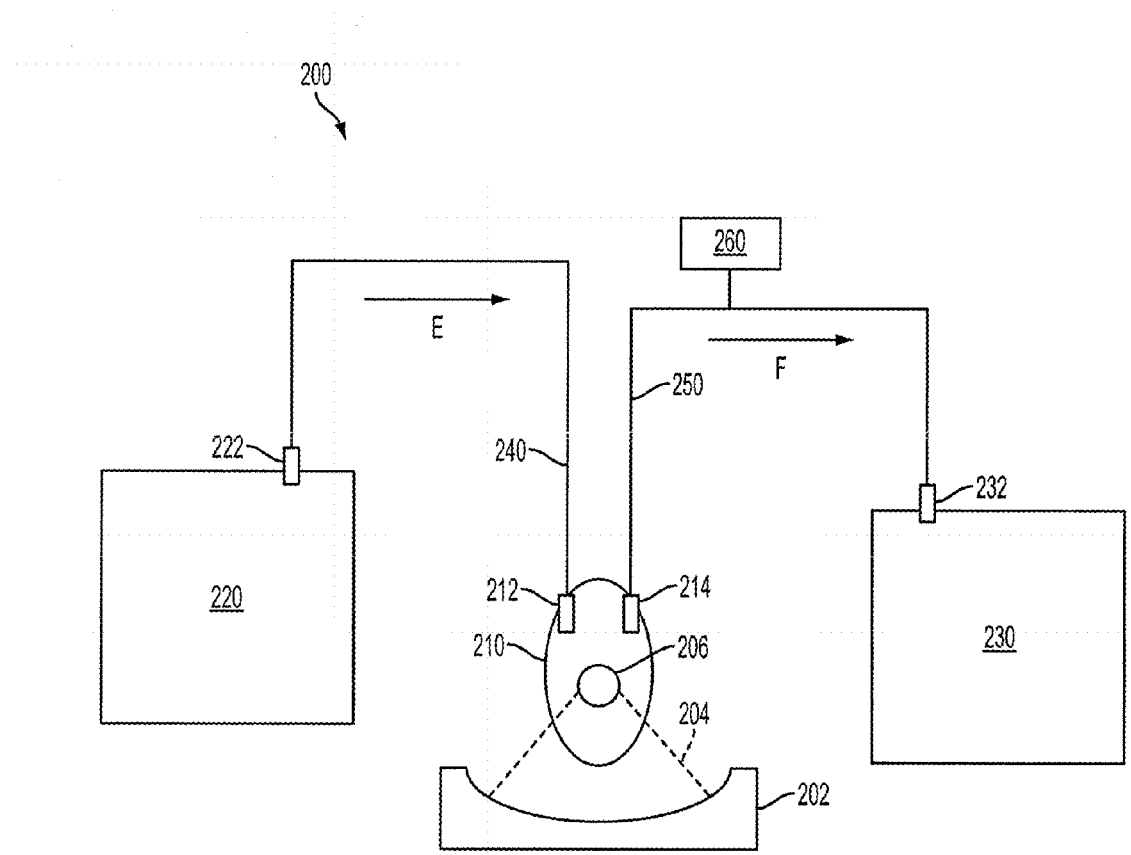
FIG. 4 shows a schematic diagram of a different acoustic treatment system in accordance with an illustrative embodiment.

FIG. 4 shows another illustrative embodiment of a focused acoustic processing system 200 that enables large scale focused acoustic treatment of sample material. This system provides for a single pass of sample material through the process chamber. The system includes a first reservoir 220 for holding a supply of sample material to be treated, a process chamber 210 which provides a space for sample material to undergo acoustic treatment and a second reservoir 230 for receiving sample material having already been treated. The first reservoir 220 includes a reservoir outlet 222 to allow outflow of sample material from the reservoir into conduit 240 and along the direction of arrow E. The process chamber 210 includes a chamber inlet 212 for permitting inflow of the sample material into the process chamber. During treatment, acoustic transducer 202 creates acoustic waves 204 to form a suitable focal zone 206 to which the sample material is exposed. When the sample material is sufficiently treated, a suitable amount of sample material may exit from the process chamber through chamber outlet 214 and into a conduit 250 so as to travel along the direction of arrow F and into the second reservoir 230 via reservoir inlet 232. While a larger amount of sample material may be acoustically treated in this system than an amount of sample material defined by the volume of the process chamber, flow of sample material is not cyclical in nature, as is provided in FIG. 3.

Similar to that described above with respect to FIG. 3, any suitable motive force may be provided to cause the sample material to move from the first reservoir 220 to the process chamber 210 and from the process chamber to the second reservoir 230. In some embodiments, a pump 260 is provided to force the sample material to move through the focused acoustic processing system. As shown in FIG. 4, and without limitation, the pump 260 may be coupled to a conduit, for example and without limitation, conduit 250 and appropriately operated.

Figure 5:
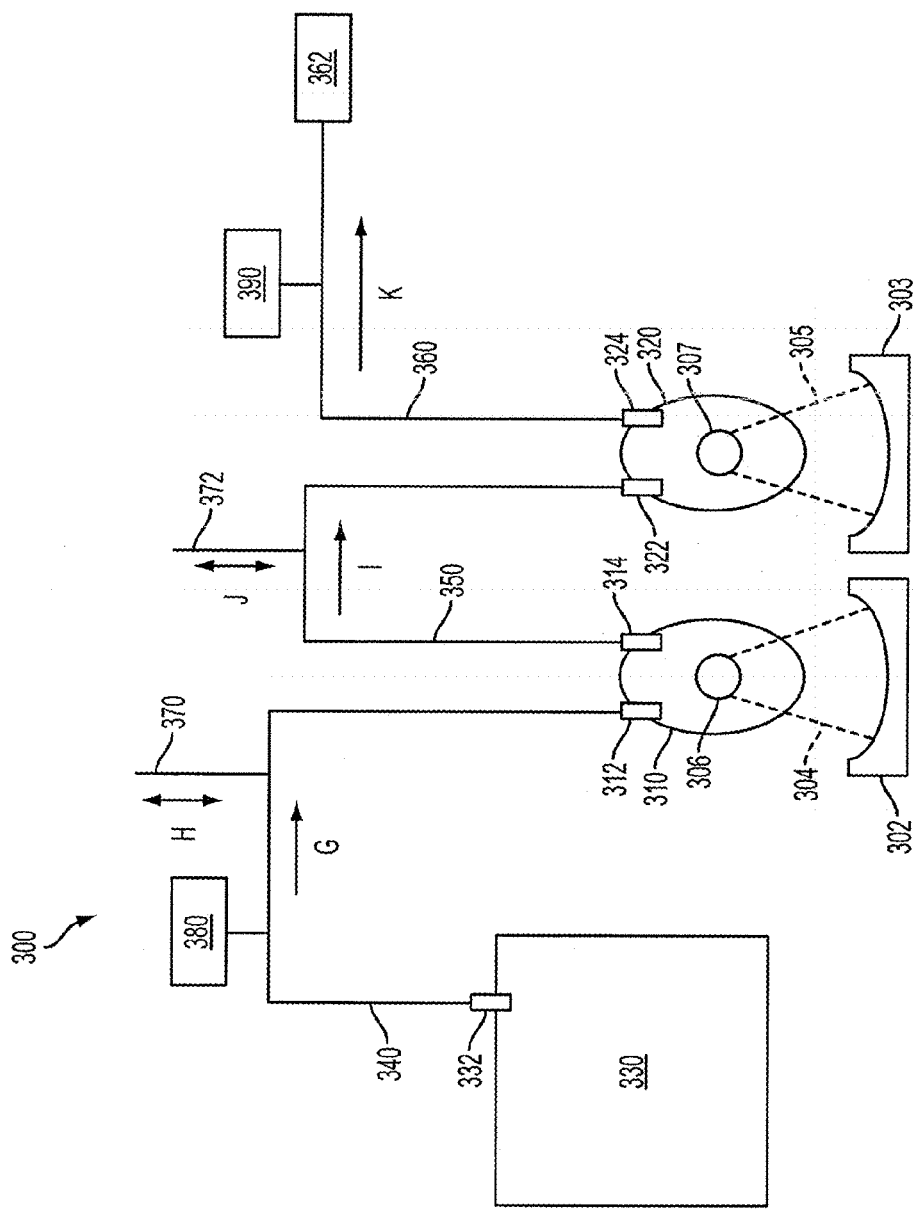
FIG. 5 illustrates a schematic diagram of yet another acoustic treatment system in accordance with an illustrative embodiment.

FIG. 5 depicts an illustrative embodiment of a focused acoustic processing system 300 that provides for large scale focused acoustic treatment of sample material where multiple processing chambers are employed. The system illustrated allows sample material to pass through each processing chamber where sample material may be subject to similar or different focused acoustic processing condition. In addition, portions of sample material may be added or removed between processing chambers, as desired.

A reservoir 330 holds a supply of sample material to be treated in a first process chamber 310 and a second process chamber 320 which each provide space for sample material to undergo focused acoustic treatment. The reservoir 330 includes a reservoir outlet 332 for allowing outflow of sample material from the reservoir into conduit 340 and along the direction of arrow G. The process chamber 310 includes a chamber inlet 312 for permitting inflow of the sample material into the process chamber. During acoustic treatment, transducer 302 provides acoustic waves 304 to form an appropriate focal zone 306 to which the sample material is exposed. Upon sufficient acoustic treatment of the sample material, a suitable amount of sample material may exit from the process chamber through chamber outlet 314 and into a conduit 350. The sample material may travel along the direction of arrow I and eventually enter into the second process chamber 320 via chamber inlet 322. The sample material may undergo further acoustic treatment within the space defined by second process chamber 320 under the same or different treatment conditions as that of the first process chamber 310. The transducer 303 creates acoustic waves 305 in forming a suitable focal zone 307 which is useful for acoustic processing of the sample material. After suitable acoustic treatment, the sample material may flow out of the second process chamber 320 via chamber outlet 324 and into conduit 360 for movement along the direction of arrow K for collection at drain 362.

In some embodiments, and as shown in FIG. 5, a pump 380 is provided to provide motive force to cause movement of the sample material through the focused acoustic processing system. While the pump 380 is depicted to be coupled to conduit 340, it can be appreciated that any suitable pump may be coupled to the focused acoustic processing system at any appropriate location.

Conduits 370, 372 may be provided at appropriate locations in the system so as to allow for sample material to be added and/or removed as needed. For example, as sample material moves along conduit 340 toward first process chamber 310, conduit 370 may provide an added ingredient (e.g., a drug, carrier surfactant, etc.) to be acoustically processed in process chamber 310 along with the sample material. Similarly, conduit 372 may also remove or provide an additional ingredient that can be processed acoustically along with the sample material in process chamber 320. Direction arrows H, J are to illustrate that conduits 370, 372 may be utilized to add or remove material, as appropriate. It can be appreciated that any focused acoustic processing system may, as appropriate, provide certain locations where sample material may be supplemented with an additional ingredient or where a portion of sample material may be removed from the processing system.

In some embodiments, focused acoustic processing systems described herein may incorporate a suitable feedback control system for sensing characteristics of the acoustic sample treatment and adjusting parameters of the system based on the sensed characteristics. For example, certain features of the sample material may be monitored, such as for example, the particle size distribution of the sample material, the average particle size within the sample material, the volume of the sample material at various locations along the processing system, the rate at which sample material is moving through the system, or any other suitable characteristic.

For instance, after undergoing acoustic treatment through the first of two process chambers, the system may sense that the average particle size of the sample material is greater than the desired average particle size at that point. As a result, the acoustic treatment of the sample material in the second process chamber may be adjusted accordingly (e.g., the treatment could be prolonged, the power output from the transducer may be increased, etc). Or, it may be desired that 90% of the particles within a sample material should be within a certain size range and it is determined (by a computer or a user monitoring the size range) that 90% of the particles of the sample material are below the preferred size range at that point during treatment. Thus, the process parameters may be adjusted accordingly to subject the sample material to a shortened treatment period resulting in a general decrease in particle size reduction within the sample material. Alternatively, it may be determined that an insufficient amount of surfactant is provided in the sample material for suitably forming liposomes or micelles to encapsulate a bioactive agent. Accordingly, additional surfactant may be injected into the sample material (e.g., through conduits 370, 372) so that the liposomes/micelles may appropriately form. Other characteristics of the sample material may be monitored as well, resulting in suitable adjustments in processing parameters.

For an example where the size of pre-existing particles within a mixture of compositions are reduced, the average starting size of particles in the mixture may range between about 10 microns and about 500 microns, and upon exposure of the mixture to focused acoustic energy under suitable conditions, the resulting average size of particles within the mixture may range, for example, between 10 microns and 50 microns, or between 10 nm and 100 nm. In another example of particle size reduction, the average starting size of particles in a mixture having a volume of between 15 mL and 20 mL including a drug (e.g., ibuprofen) may be approximately 200 microns. After the mixture is exposed for 10 minutes to a focal zone of acoustic energy having a frequency of about 1 MHz at a power of about 150 W, the average size of particles within the mixture may be reduced to about 40 microns. Upon exposure of the mixture to the same focused acoustic conditions for less than an hour (e.g., 30 minutes), the average size of particles within the mixture may be reduced to less than 100 nm. Increased exposure of the mixture to the focused acoustic conditions may result in a mixture having an even smaller average particle size. In some embodiments, exposure of a mixture having both a therapeutic composition and a carrier composition to focused acoustic energy may result in the controlled reduction of particles within the mixture to percentages as low as 0.01% of the average starting size of particles within the mixture (e.g., from an average size of 200 microns to an average size of 10 nm).

Mixtures described herein may include a number of compositions, for example, in the form of a precursor to a nanoformulation, or the mixture may be the nanoformulation itself. In some cases, one or more of the compositions within a mixture, or nanoformulation, may be any pharmaceutical, nutraceutical, cosmeceutical, or combination thereof.

Pharmaceuticals can be used as a bioactive composition in a mixture and can include, but are not limited to, selective estrogen receptor modulators (SERM) (e.g., tamoxifen), alkylating agents (e.g., substituted imidazole compounds such as dacarbazine), taxane compounds (e.g., paclitaxel), a nucleoside analog (e.g., gemcitabine), a statin (e.g., lovastatin, atorvastatin, simvastatin, and the like), a pyrimidine analog (e.g., 5-fluorouracil), nucleic acid molecules (e.g., DNA, RNA, mRNA, siRNA, RNA interference molecules, plasmids, etc.), drugs (e.g., ibuprofen, cinnarizine, indomethacin, griseofulvin, felodipine, quercetin, etc.), and the like. Any suitable pharmaceutical may be incorporated in nanoformulations described herein.

As discussed, compositions within nanoformulations may include polynucleotide molecules such as siRNA, RNA, DNA, plasmids, or polypeptide compounds. In accordance with some embodiments, siRNA or other polynucleotide-containing nanoformulations may be prepared without degeneration of the siRNA molecules, or at least without significant degeneration of the siRNA or other molecules. That is, the composition comprising siRNA molecules provided as part of the nanoformulation generally preserves their function in modulating the activity of a counterpart mRNA molecule or other target compound so as to have an overall effect on the expression of a protein or other function of the target. The polynucleotide or polypeptide compound may be an antisense compound with respect to the target. In the case of mRNA, some of the functions that may be interfered with include translocation of the mRNA to a site for protein translation, actual translation of protein from the mRNA, splicing of the mRNA to yield one or more mRNA species, turnover or degradation of the mRNA and possibly independent catalytic activity which can be engaged in by the RNA. The overall effect of such interference with mRNA function may manifest itself as modulation of the expression of one or more proteins, which may result in either an increase (stimulation) or a decrease (inhibition) in the expression of a gene.

The inventors have recognized that methods other than the use of focused acoustics for producing siRNA or other polynucleotide-containing nanoformulations cause degradation of the polynucleotide compounds, e.g., because of the mechanical shear, pressures, foreign matter contamination, and/or heat introduced to the compounds during the nanoformulation process. A nanoformulation prepared using focused acoustics including siRNA or other polynucleotide compounds may have a higher efficacy or other functional performance, e.g., because of the lower amounts of heat introduced into the material during the nanoformulation process, as well as reduced mechanical shear, pressures and/or contaminants introduced. For example, in the case of siRNA, the molecule is relatively labile and undergoes degeneration under the influence of nucleases in an unsterile environment and elevated temperature levels. Focused acoustics processes for producing nanoformulations with siRNA tend to control the temperature sensitivity of the siRNA. Thus, aspects described herein may enable the production of a nanoformulation including an siRNA or other polynucleotide material with a therapeutic or other functional effectiveness that is simply not possible with other processes.

As at least one of the compositions within a mixture may include a therapeutic agent, one or more other compositions within a mixture may include a non-therapeutic agent. In some embodiments, a composition within the mixture may include a carrier compound useful for packaging of other compositions (e.g., therapeutic agents) in the mixture. In some cases, the mixture may include a surfactant that may function to lower the surface tension of a liquid in the mixture, such as interfacial tension between two liquids, or tension between a liquid and a solid.

Surfactants may include one or more amphiphilic molecules having both hydrophobic and hydrophilic groups. A suitable surfactant may be anionic, for example, having at least one of a sulfate (e.g., ammonium lauryl sulfate, sodium lauryl sulfate, sodium dodecyl sulfate, sodium laureth sulfate, sodium myreth sulfate), sulfonte (e.g., dioctyl sodium sulfosuccinate, perfluorooctanesulfonate, perfluorobutanesulfonate, alkyl benzene sulfonate), phosphate (e.g., alkyl aryl ether phosphate, alkyl ether phosphate), or carboxylate group (alkyl carboxylates, sodium stearate, sodium lauroyl sarcosinate, perfluorononanoate, perfluorooctanoate). In some embodiments, surfactants may be cationic, zwitterionic, or nonionic.

In some embodiments, nanoformulations of the present disclosure may be prepared as emulsions (e.g., nanoemulsions) which may include a dispersion medium, such as an aqueous media or an oil-based media. In one embodiment, the oil-based media is selected from the group including, but not limited to, saturated and unsaturated oils from vegetable and marine sources, silicone oils, mineral oils, and plant-derived oils. A surfactant, if included, can be any ionic (e.g., anionic, cationic), nonionic, or zwitterionic material.

In some embodiments, exposing the mixture to the focal zone may include processing of the mixture in an isothermal environment. As the focused acoustic energy applied to the mixture does not have a significant degree of randomly scattered energy (i.e., in the form of heat), the temperature of a sample material may, in general, be maintained within a suitable degree of variation. For example, the temperature of the mixture may be maintained at a temperature within about 5 degrees C., within about 2 degrees C., or within about 1 degree C. of a starting temperature.

Nanoformulations prepared in accordance with methods described herein may have any suitable particle size distribution. Although not required, in some embodiments, systems and methods described that involve the use of focused acoustic energy to prepare nanoformulations result in a particle size distribution that is unimodal. For example, the particle size distribution may be similar to a Gaussian distribution. However, in other cases, the particle size distribution of suitable nanoformulations is multi-modal. In some embodiments, the PDI of particle size distributions of the acoustically treated nanoformulations is less than 0.5, less than 0.3, less than 0.1, less than 0.08, or less than 0.06. For example, the PDI of particle size distributions of suitably acoustically treated nanoformulations may be between about 0.03 and about 0.1, between about 0.05 and about 0.09, or between about 0.06 and about 0.08. In some embodiments, the relative standard deviation of the particle size distribution of the acoustically treated nanoformulations may be less than 1%, less than 0.5%, or between 0.1% and 0.8% of an average particle size of the nanoformulation.

As discussed herein, a particle size distribution may be expressed in terms of the number of particles that are above or below a particular threshold size. A d90 particle size for a plurality of particles refers to 90% of the particles having a size greater than the given d90 size. For example, a plurality of particles having a d90 particle size of 10 microns is defined as 90% of the particles having a size greater than 10 microns. Accordingly, for the same example, 10% of the particles have a size less than 10 microns. A d50 particle size for a plurality of particles refers to 50% of the particles having a size greater than the given d50 size, i.e., the median. A d10 particle size for a plurality of particles refers to 10% of the particles having a size greater than the given d10 size. In general, d90, d50 and d10 particle size measurements discussed herein are in reference to a substantially unimodal particle size distribution.

The shelf life of nanoformulations prepared using focused acoustic energy of the present disclosure may be longer than that of formulations prepared using conventional techniques. In some instances, particles of suspensions, emulsions or certain carrier formulations (e.g., liposome or micelle encapsulated bioactive agents), when stored in an ambient environment, may have a tendency to coalesce into larger particles, exhibiting a relatively short shelf life particle size distribution. For example, in the case of liposome or micelle particles, phospholipid molecules of neighboring particles may combine together, resulting in an overall increase of the average particle size in the mixture. Or, particles within a conventional mixture may have a tendency to degrade (i.e., lose functionality) over time. However, nanoformulations described herein may exhibit a relatively long shelf life without sample degradation (i.e., maintaining functionality) as compared to formulations prepared using conventional methods. In some embodiments, the particle size distribution of nanoformulations prepared in accordance with systems and methods described herein may be generally stable. That is, there is minimal tendency for small particles of a nanoformulation suitably formed through focused acoustics to coalesce into larger particles over time. In some embodiments, upon allowing a preferred nanoformulation to stand for 12 hours, 24 hours, 2 days, 5 days, 1 week, 1 month, 1 year, or longer, the average particle size and/or polydispersity index of embodiments of the nanoformulation fluctuates by no more than 2%, 5% or less than 10%. In some embodiments, the desired size distribution of particles formed in a nanoformulation (e.g., 100 nm, 1 micron, 10 microns, 50 microns, having a low PDI, etc.) may be maintained over a prolonged period of time, such as for example, between 1 day and 24 months, between 2 weeks and 12 months, or between 2 months and 5 months.

As described previously, focused acoustic energy may be applied to a mixture including various compositions under conditions that result in the formation of a plurality of particles having an average size of between approximately 10 nm and approximately 50 microns. In some embodiments, particles resulting from suitable exposure of the mixture to the focused acoustic field over a time period have an average size of between approximately 20 nm and approximately 100 nm, between approximately 100 nm and approximately 10 microns, or between approximately 10 microns and approximately 50 microns. In some cases, the average size of particles within the mixture after suitable exposure to the focused acoustic energy may be less than 50 microns, less than 40 microns, less than 30 microns, less than 20 microns, less than 10 microns, less than 1 micron, less than 500 nm, less than 100 nm, less than 50 nm, less than 20 nm, or less than 10 nm.

When exposed to focused acoustic energy according to methods described herein, a mixture may experience a general reduction in particle size. In some embodiments, the average size of particles in the mixture after acoustic treatment under appropriate conditions may be reduced to an average particle size that is less than 50%, less than 20%, less than 10%, less than 1%, less than 0.05% of the average starting particle size. For example, after exposure of the mixture to the focal zone of the acoustic energy for a suitable period of time, an average size of all particles in the mixture is between 0.01% and 50%, between 0.05% and 5%, between 0.1% and 3%, between 0.5% and 1%, between 1% and 10%, between 10% and 20%, between 20% and 30%, between 30% and 40%, or between 40% and 50% of the average starting particle size prior to exposure to the focal zone. In an embodiment, an average size of a plurality of particles in a mixture may be reduced from at least 200 microns to less than 1 micron upon subjecting the mixture to acoustic treatment for less than 60 minutes.

In some embodiments, the average starting particle size within the mixture prior to exposure to the focal zone may be between approximately 10 microns and approximately 500 microns, between approximately 50 microns and approximately 300 microns, or between approximately 100 microns and approximately 200 microns. In some cases, the average starting size of particles within the mixture prior to exposure to the focal zone may be greater than 10 microns, greater than 50 microns, greater than 100 microns, greater than 200 microns, greater than 300 microns, greater than 500 microns, or greater than 1000 microns.

In some embodiments, a mixture subject to focused acoustic treatment that results in a nanoformulation having a preferred range of particle size does not experience a general reduction in particle size. For example, focused acoustic energy can be used to treat mixtures having multiple compositions where particles within the mixture are not processed to experience a size reduction, but rather, are acoustically processed to form a particular type of nanoformulation, such as a liposome/micelle, nanosuspension, and/or nanoemulsion. Nanoformulations prepared by subjecting a mixture of suitable compositions to focused acoustic energy so as not to experience a reduction in average particle size may, in some embodiments, encapsulate a therapeutic agent.

As discussed above, focused acoustics can be used to enhance efficiency and impart a large degree of convenience to the preparation of nanoformulations. In some embodiments, the time of exposure of a mixture to a focused acoustic field resulting in a suitable nanoformulation is short. For example, a mixture may be exposed to a focused acoustic field to form a suitable nanoformulation for a time period of less than 2 days, less than 1 day, less than 12 hours, less than 10 hours, less than 5 hours, less than 1 hour, less than 30 minutes, less than 10 minutes, or less than 5 minutes. In contrast, existing methods of preparing suitable nanoformulations may involve a number of steps that require substantial amount of time, in addition to other factors (e.g., likelihood of contamination, heating of the sample, low degree of repeatability, etc.) that make other existing methods undesirable.

Focused acoustic systems may operate at any suitable power for preparing nanoformulations having preferred characteristics. In some embodiments, a focused acoustic field is operated at a power of between 50 Watts and 250 Watts, between 100 Watts and 200 Watts, between 120 Watts and 170 Watts, or about 150 Watts.

In some embodiments, the amount of time, power and/or effort required to prepare a suitable nanoformulation from an initial mixture is not largely dependent on the volume of the mixture. In other words, it is not necessary to substantially extend the period of time under which a low volume mixture (e.g., 5 mL) is required to be exposed to the focused acoustic energy for a similar mixture that is scaled up to have a higher volume (e.g., 250 mL). For example, suitable nanoformulations may result from mixtures having respective volumes of 5 mL and 250 mL that are appropriately exposed to a focused acoustic field for 30 minutes. In some embodiments, suitable nanoformulations may result upon exposure of an appropriate focused acoustic field to mixtures comprising a volume of between about 1 mL and about 500 mL, between about 5 mL and about 250 mL, or between about 10 mL and about 100 mL.

In some cases, it may be suitable to expose mixtures having significantly large volumes (e.g., greater than 5 L) to focused acoustic energy for a longer period of time as compared to a mixture that has a much smaller volume (e.g., less than 10 mL) to yield a similar nanoformulation result. For example, subjecting a mixture having a volume of 500 mL to a focused acoustic field for 60 minutes may result in a nanoformulation having similar characteristics as a similar example where a mixture having a volume of 250 mL is subjected to a focused acoustic field for 30 minutes. Accordingly, in some embodiments, to achieve a particular nanoformulation result (e.g., average particle size, polydispersity index, particle size reduction, particle size distribution, etc. in accordance with nanoformulation results described herein), a mixture of compositions may be exposed to a suitable focused acoustic field, for example, for 30 minutes per 10 mL of mixture, 30 minutes per 50 mL of mixture, 30 minutes per 100 mL of mixture, 30 minutes per 250 mL of mixture or 30 minutes per 500 mL of mixture or 30 minutes per 1000 mL of mixture. Similarly, in some embodiments, a suitable nanoformulation result may arise after exposure of a mixture of compositions to an appropriate focused acoustic field, for example, for 15 minutes per 500 microliters of mixture, 15 minutes per 1 mL of mixture, 15 minutes per 2 mL of mixture, 15 minutes per 10 mL of mixture, 15 minutes per 50 mL of mixture or 15 minutes per 100 mL of mixture.

Similar to that with respect to volumes, for some embodiments, the amount of time, power and/or effort required to prepare a suitable nanoformulation from an initial mixture might not depend largely on the concentration of the mixture. For example, nanoformulations having similar particle size distributions may result from subjecting mixtures having a composition at respective concentrations of 1 mg/mL and 100 mg/mL to a suitable focused acoustic field for 30 minutes. In some embodiments, nanoformulations having preferred characteristics may arise upon exposure of an appropriate focused acoustic field to mixtures comprising a composition in the mixture having a concentration of between about 1 mg/mL and about 500 mg/mL, between about 1 mg/mL and about 100 mg/mL, between about 15 mL and about 100 mg/mL, or between about 40 mg/mL and about 70 mg/mL. For example, the percent difference of the variation in particle size (e.g., d90, d50, d10, average size, etc.) between widely varying concentrations (e.g., between 1 mg/mL and 100 mg/mL) as compared to the starting particle size prior to focused acoustic processing may be less than 15%, less than 10%, less than 5%, less than 3% or less than 1%.

In some cases, it may be beneficial to expose mixtures having significantly large concentrations of a composition (e.g., greater than 5 g/mL) to focused acoustic energy for a longer period of time as compared to mixtures having much smaller concentrations of the particular composition (e.g., less than 1 mg/mL) to result in a similar nanoformulation. For instance, subjecting a mixture having a concentration of 200 mg/mL to a focused acoustic field for 60 minutes may result in a nanoformulation having similar characteristics as a similar situation where a mixture having a concentration of 100 mg/mL is subjected to a focused acoustic field for 30 minutes. In some embodiments, to achieve a particular nanoformulation result (e.g., average particle size, polydispersity index, etc.), a mixture of compositions may be exposed to a suitable focused acoustic field, for example, for 30 minutes per 100 mg/mL of mixture, 30 minutes per 200 mg/mL of mixture or 30 minutes per 300 mg/mL of mixture.

While it can be appreciated that any combination of the above regarding parameters such as processing time, mixture volume and composition concentration may be suitable for producing a nanoformulation having a preferred particle size distribution, a number of example particle size distributions are discussed below. In one embodiment, at least 90% of all particles in a mixture may have a size greater than 40 microns prior to exposure of the mixture to the focused acoustic energy. However, after exposure of the mixture to the focused acoustic energy for less than about 5 minutes or less than 10 minutes, at least 90% of all particles in the mixture may have a resulting size less than 40 microns. In another embodiment, at least 90% of all particles in a mixture may have a size greater than 100 microns prior to exposure of the mixture to the focused acoustic energy. After exposure of the mixture to focused acoustic energy for less than about 10 minutes, at least 90% of all particles in the mixture may have a resulting size less than 20 microns. In a further embodiment, at least 90% of all particles in a mixture may have a size greater than 150 microns prior to exposure of the mixture to the focused acoustic energy. Though, after exposure of the mixture to focused acoustic energy for less than about 5 minutes, at least 90% of all particles in the mixture may have a size less than 15 microns. In yet another embodiment, after exposure of a mixture to focused acoustic energy for less than about 10 minutes, at least 90% of all particles in the mixture may have a size less than 20% of a starting d90 size of all particles in the mixture prior to exposure to the focused acoustic energy. In a further embodiment, after exposure of a mixture to focused acoustic energy for less than about 5 minutes, at least 90% of all particles in the mixture may have a size less than 10% of a starting d90 size of all particles in the mixture prior to exposure to the focused acoustic energy.

As mentioned above, an increase in process volume of the mixture may involve an increase in the acoustic processing time period. In an embodiment, for a mixture having a processing volume of over 200 mL (e.g., about 250 mL), exposure of the mixture to a suitable focused acoustic field for less than about 60 minutes may result in at least 90% of all particles in the mixture having a size less than 15% of a starting d90 size of all particles in the mixture prior to exposure to the focused acoustic field. In another embodiment, exposure of a mixture having a processing volume over 200 mL to a focused acoustic field for less than about 30 minutes may result in at least 50% of all particles in the mixture having a size less than 20% of a starting d50 size of all particles in the mixture prior to exposure to the focused acoustic field. In a further embodiment, exposing a mixture having a processing volume over 200 mL to a focused acoustic field for less than about 15 minutes may result in at least 10% of all particles in the mixture having a size less than 15% of a starting d10 size of all particles in the mixture prior to exposure to the focused acoustic field. In yet another embodiment, exposure of a mixture having a processing volume over 200 mL to a focused acoustic field for less than about 60 minutes results in an average size of all particles in the mixture to be less than 0.5% of an average starting size of all particles in the mixture prior to exposure to the focused acoustic field. In a further embodiment, exposing a mixture having a processing volume over 200 mL to a focused acoustic field for less than about 10 hours results in an average size of all particles in the mixture less than about 0.2% of an average starting size of all particles in the mixture prior to exposure to the focused acoustic field.

In various embodiments, aspects described herein contemplate a nanoformulation comprising a population of particles having diameters between approximately 10 and approximately 400 nanometers, wherein said nanoformulation is not contaminated by particles having diameters larger or smaller (i.e., the sample is monodisperse). In one embodiment, the particles encapsulate a compound or compounds. The compound can be pharmaceutical, nutraceutical, and cosmeceutical.

In another embodiment, the present disclosure contemplates a method for forming a nanoformulation comprising forming a mixture including an active ingredient or ingredients, a liquid dispersion medium and a liquid carrier, where the compound has solubility greater than 3 mg/ml in said medium. An acoustic energy wave train is directed toward the mixture held within a vessel to expose the mixture to an acoustic energy field having a frequency of between about 100 kilohertz and about 100 megahertz and that converges in a focal zone, having a width of less than about 2 centimeters, that is located primarily within the vessel. A nanoformulation is formed in the mixture in response to exposure to the acoustic energy field at the focal zone, wherein the nanoformulation includes a population of particles of the liquid dispersion medium suspended in the liquid carrier. Each particle contains at least some of the active ingredient and has a diameter between approximately 10 nanometers and approximately 400 nanometers.

In one embodiment, the dispersion medium is selected from the group consisting of aqueous media and oil-based media. In one embodiment, the oil-based media is selected from the group including, but not limited to, saturated and unsaturated oils from vegetable and marine sources, silicone oils, mineral oils, and plant-derived oils. A surfactant, if included, can be any ionic, nonionic, or zwitterionic material.

In one embodiment the present invention contemplates a method for enhancing the synthesis of a nanocrystal created from processes such as polymer based, metal based, or drug nanoparticle formation (e.g., Gold, Iron Oxide, and drug nanocrystals).

In another embodiment, aspects of the present disclosure can also be used in the preparation of calcium carbonate nano-particles which can be used in the process of cement making for the fillers used in tooth repair or other dental techniques.

In another embodiment, the present disclosure contemplates a uniform focused ultrasonic acoustic nanoformulation comprising bacteria-resistant properties. In one embodiment, said bacterial-resistant properties comprise acoustical shear-force induced cell lysis. In one embodiment, the nanoformulation is sterile.

In accordance with aspects described herein, a nanoformulation prepared by focused acoustics may include antisense compounds that can be used as research reagents, diagnostic aids, therapeutic agents and/or for other purposes. Antisense oligonucleotides, which are able to inhibit gene expression with specificity, can be used to elucidate the function of particular genes, e.g., siRNA can be used as sequence-selective inhibitors of transcription as part of a screening process that includes the technique known as SELEX, known by those skilled in the art. The SELEX procedure can allow for identification of nucleic acid molecules with unique sequences, each of which has the property of binding specifically to a desired target compound or molecule.

Antisense compounds are also used, for example, to distinguish between functions of various members of a biological pathway. Nanoformulations produced in accordance with aspects described herein can also include other oligomeric antisense compounds, including, but not limited to, oligonucleotide mimetics. The antisense compounds can be active components in a nanoformulation produced by focused acoustics and have from about 8 to about 30 nucleotide bases (i.e., from about 8 to about 30 linked bases), although both longer and shorter sequences may find use with the present invention. For example, such antisense active components can be antisense oligonucleotides, such as those comprising from about 12 to about 25 nucleotides.

In one embodiment, the present disclosure contemplates the production of nanoemulsions that significantly improve the efficacy of a pharmaceutical or other active compound. In one illustrative method: a) a subject refractory to an administered compound at a therapeutically effective amount is identified; and b) a nanoemulsion is delivered to the subject under conditions such that the compound bioavailability is improved and wherein said compound is therapeutically effective. In one embodiment, the improved bioavailability comprises pharmacokinetic parameters selected from the group consisting of decreased Tmax, increased Cmax, and increased AUC. In one embodiment, the delivery comprises a method selected from the group consisting of oral, transdermal, intravenous, intraperitoneal, intramuscular, and subcutaneous methods of delivering the nanoemulsion.

Nanoemulsions can be formed by different types of processes, such as high energy emulsification methods and low energy phase inversion temperature methods. In one high energy emulsion forming method, a mixture of nanoemulsion components (e.g., oil, water, surfactant, and an optional pharmaceutical, nutraceutical, or cosmeceutical agent) is subjected to a continuous turbulent flow at high pressure (e.g., at least 24,000 psi) to form the nanoemulsion using a microfluidizer apparatus (e.g., as described by Cook et al. in U.S. Pat. No. 4,533,254 filed on Feb. 21, 1984, and U.S. Pat. No. 4,908,154, filed on May 26).

Alternatively, nanoemulsions can be formed by low energy "self-assembly nanoemulsion" (SANE) methods without microfluidizer processing by combining a surfactant capable of temperature-dependent phase inversion (e.g., a nonionic polyethoxylated surfactant) with other nanoemulsion components (e.g., oil, water, and an optional pharmaceutical, nutraceutical or cosmeceutical agent). This technique is referenced in published PCT application number WO/2009/121069. The nanoemulsion components are mixed and heated above a phase inversion temperature (PIT) of the surfactant (i.e., the temperature at which the affinity of the surfactant for the different phases changes). For example, an oil-in-water (O/W) macro-emulsion can undergo a reversible, temperature-dependent transitional phase inversion above the PIT to form water-in-oil (W/O) emulsion. Subsequent rapid cooling of the W/O emulsion below the PIT, for example by thermal cooling or adding water, can result in the formation of a kinetically stable O/W nanoemulsion composition of oil droplets (optionally containing the pharmaceutical, nutraceutical, or cosmeceutical agent) suspended in water. Thermal cooling to form a nanoemulsion can be performed, for example, by placing the vessel containing the W/O emulsion in an ice bath. Unless otherwise indicated, "rapid cooling" refers to cooling at a rate suitable to form a nanoemulsion without microfluidization.

However, each of these processes have significant technical and commercial drawbacks. In the case of microfluidization, the mixture is subjected to extremely high pressures (e.g., 40,000 psi) during the process that can have negative effects on the active ingredients. Additionally, these high pressures and high shear stresses on the fluids can create heat, which further degrades the active component. The microfluidization device requires sensitive and complex operation and considerable operator skill. Also, microfluidizers leave a significant portion of unrecoverable material in the system post processing, thus losing valuable yield. This yield loss is especially significant for processing of volumes under 50 mL, frequently losing 20% to 40% of the material during the process. Furthermore, the microfluidization device requires cleaning between samples and therefore, has the potential for cross contamination between samples.

In the case of SANE techniques, specific surfactants and ratios must be used. Although very small droplet sizes, and tight size distributions can be achieved, nanoemulsions created with SANE techniques show reduced shelf life and stability over time, especially if subjected to sunlight and temperatures. Simply storing a SANE sample at room temperature can in some cases cause degradation over a few weeks. Also, very specific surfactants, ratios, and combinations must be used to achieve a stable nanoemulsion using SANE techniques. These surfactants can be detrimental to the pharmacokinetic performance of the formulation. Additionally, the surfactants could be detrimental in other ways such as toxicity or shortening shelf life. The SANE technique is known to encapsulate smaller amounts of the encapsulant compared to other technologies (e.g., a SANE process can take up to 1-2 mg/mL depending on the oil and surfactant ratio (1:5), but a a microfluidized system can go above 4 mg/mL.)

Although some prior techniques for forming nanoemulsions may have drawbacks, the use of focused acoustics according to aspects of the invention can be a complement to microfluidization, SANE, and polymer based techniques. In the case of SANE processes, focused acoustic processing could be applied during the pre-heat and phase inversion temperature steps of the process, possibly yielding more desirable size distribution, lower, or a wider range of surfactant requirements. Focused acoustics can also be combined with microfluidization, either upstream or downstream of the fluidizer channel, or also in the channel itself thus increasing energy levels and yielding a better size distribution, or increasing throughput or lowering pressure requirements.

EXAMPLES

The following examples are intended to illustrate certain embodiments of the present invention, but are not to be construed as limiting and do not exemplify the full scope of the invention.

Example 1

Figure 6:
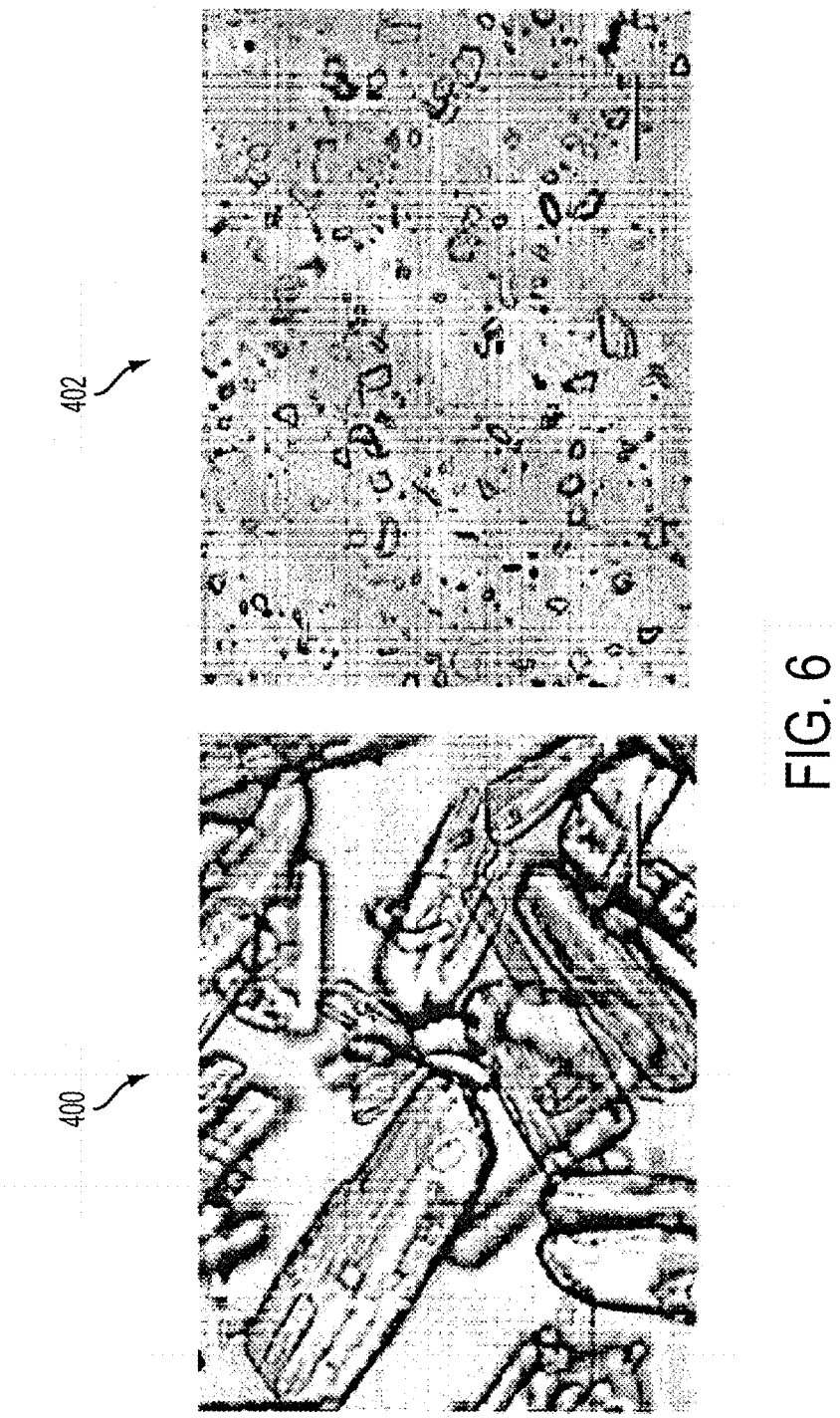
FIG. 6 shows a micrograph of particles within a mixture before and after acoustic treatment in accordance with an example.

Suspension mixtures were prepared in water (deionized and purified by a Barnstead water purification system), methyl cellulose (from Sigma Aldrich) and sodium lauryl sulfate (from Fisher Scientific) for Ibuprofen (from Spectrum Chemicals), Cinnarizine (from Spectrum Chemicals), Indomethacin (from Spectrum Chemicals) and Griseofulvin (from MP Bio). The initial particle sizes of these suspension mixtures was reduced subject to focused acoustic processing using a Covaris SF220 High Performance Formulation Processing System under 150 Watts of power. Particle size distributions were measured using a Malvern Zetasizer Nano ZS-90 in the nanometer particle size range and a Malvern Mastersizer 2000 in the micron particle size range.
Particle Size Reduction: Ibuprofen, Cinnarizine, Indomethacin, and Griseofulvin at 15 mg/mL Suspension mixtures included water, 0.5% methyl cellulose and 0.1% sodium lauryl sulfate for Ibuprofen, Cinnarizine, Indomethacin and Griseofulvin at 15 mg/mL for batches of 2 mL, 12 mL and 18 mL. The 2 mL, 12 mL and 18 mL batches were subject to focused acoustic processing for 5 minutes, 5 minutes and 10 minutes, respectively. FIG. 6 shows micrographs at 50× magnification (with a 50 micron scale bar) of Ibuprofen processed at 15 mg/mL concentration before and after focused acoustic processing. The image 400 prior to exposure to the focused acoustics depicts particles that are substantially larger (e.g., 15-20×) than corresponding particles shown in the image 402 after treatment of the particles to the focused acoustics. Particle size results for each of the four compounds are provided in Table 1 (particle sizes are noted as d90 unless specified otherwise).

TABLE 1

Particle size results (d90) for Ibuprofen, Cinnarizine, Indomethacin, and Griseofulvin.

| Parameters | Ibuprofen (microns) | Cinnarizine (microns) | Indomethacin (microns) | Griseofulvin (microns) |
|---|---|---|---|---|
| Initial | 203.67 (97% of particles above 40 microns) | 149.17 | 239.88 | 44.45 |
| 2 mL, 5 min | 12.55 (100% of particles below 20 microns) | 37.29 | 20.88 | 16.86 |
| 12 mL, 5 min | 33.35 (97% of particles below 40 microns) | 41.73 | 38.32 | 31.45 |
| 18 mL, 10 min | 39.53 (97% of particles below 40 microns) | 43.00 | 28.73 | 31.01 |

Particle Size Reduction: Ibuprofen at 1 mg/mL, 15 mg/mL and 100 mg/mL

The concentration of Ibuprofen was then varied in respective suspensions at fixed volumes of 2 mL, 12 mL and 18 mL. Table 2 lists the d90 particle sizes for Ibuprofen at each concentration. As shown, the d90 particle size results do not change significantly even though the concentration for the suspensions vary widely. For instance, after 10 minutes of focused acoustic processing, the percent difference of the greatest variation in d90 particle size (i.e., 39.53-34.04=5.49) between concentrations (i.e., for 1 mg/mL, 15 mg/mL and 100 mg/mL) as compared to the initial d90 particle size (i.e., 203.67) is less than 3%. It is thus demonstrated here that focused acoustic processing to prepare nanoformulations having wide variations in concentration may yield substantially similar results.

TABLE 2

Particle size results (d90) for Ibuprofen at 1 mg/mL, 15 mg/mL and 100 mg/mL.

| Parameters | Ibuprofen 1 mg/mL (microns) | Ibuprofen 15 mg/mL (microns) | Ibuprofen 100 mg/mL (microns) |
|---|---|---|---|
| Initial | 203.67 | 203.67 | 203.67 |
| 2 mL, 5 min | 12.55 | 19.03 | 29.54 |
| 12 mL, 5 min | 33.35 | 34.88 | 37.78 |
| 18 mL, 10 min | 39.53 | 34.04 | 35.53 |

Particle Size Reduction: Nano-Suspensions

Suspension mixtures included water, 0.025% methyl cellulose and 0.1% sodium lauryl sulfate for Ibuprofen, Cinnarizine, Indomethacin and Griseofulvin at 5 mg/mL for 2 mL batches. Each batch was subject to focused acoustic processing for 15 minutes and 30 minutes, respectively. Table 3 lists the average particle size results for each of the four compounds. Within 15 minutes, nano-suspensions were generated with an average particle size ranging between 100 nm and 280 nm for each of the mixtures. Within 30 minutes, an average particle size range of between 20 nm and 97 nm was achieved.

TABLE 3

Average particle size results for nano-suspensions.

| Parameters | Ibuprofen | Cinnarizine | Indomethacin | Griseofulvin |
|---|---|---|---|---|
| Initial | 203.67 microns | 149.17 microns | 239.88 microns | 44.45 microns |
| 15 min | 110 nm | 280 nm | 127.4 nm | 100 nm |
| 30 min | 97 nm | 56.85 nm | 20 nm | 90 nm |

Particle Size Reduction: Ibuprofen Scaled Up to 250 mL

Figure 7:
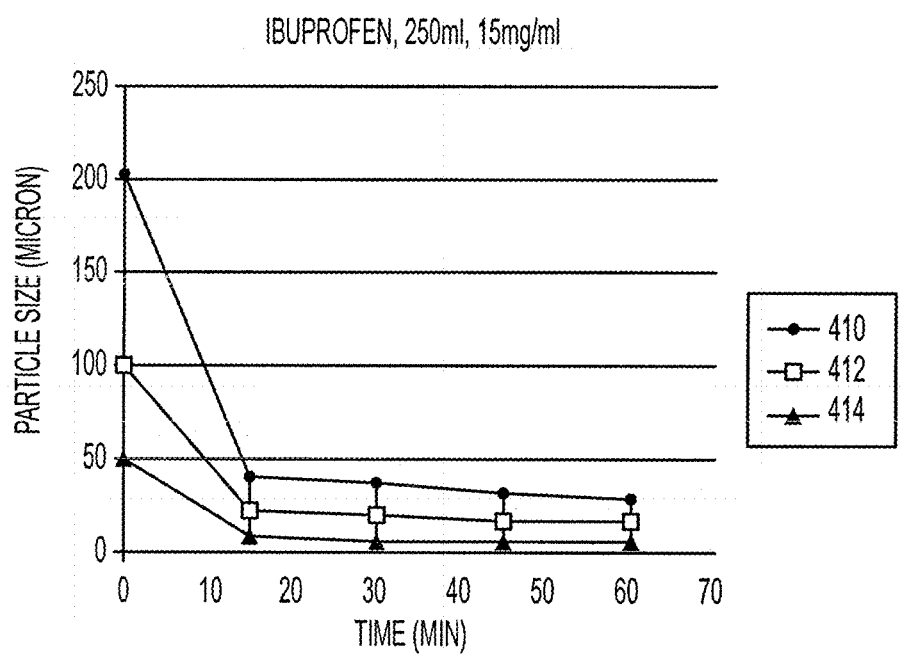
FIG. 7 depicts a graph of average particle size over time during treatment of a mixture in accordance with an example.

Using a scale-up system and without changing the mechanical attributes of the particle size reduction process, the Ibuprofen suspension mixture was increased to 250 mL. The flow rate was set to 30 mL/min. Homogeneity and stability of the system were demonstrated by sampling the 250 mL suspension at different depths (e.g., top, middle and bottom depths). Suspension aliquots were analyzed by HPLC using a stability-indicating method as a guide. At the first measured time point of 15 minutes, the suspension was determined to be homogeneous, where the particle size distribution of the suspension had a relative standard deviation of 0.40%. Through 60 minutes of focused acoustic processing, the particle size distribution of the suspension was measured to have a relative standard deviation of 0.38%. In addition, the Ibuprofen was determined to be chemically stable, showing no impurity growth over 60 minutes of processing. Table 4 shows the particle size results of the scale-up process. FIG. 7 illustrates the results of such size reduction over time for d90 particle size 410, d50 particle size 412 and d10 particle size 414.

TABLE 4

Particle size results (d90, d50, d10) for Ibuprofen scaled up to 250 mL.

| Parameters (250 mL) | Ibuprofen d90 (microns) | Ibuprofen d50 (microns) | Ibuprofen d10 (microns) | Percentage of particles below 40 microns |
|---|---|---|---|---|
| Initial | 203.67 | 97.834 | 50 | 5% |
| 15 min | 39.726 | 21.701 | 6.805 | 90% |
| 30 min | 36.328 | 19.055 | 6.023 | 93.57% |
| 45 min | 31.091 | 16.167 | 3.583 | 98.31% |
| 60 min | 28.005 | 14.843 | 3.351 | 98.39% |

Particle Size Reduction: Cinnarizine Scaled up to 250 mL

Figure 8:
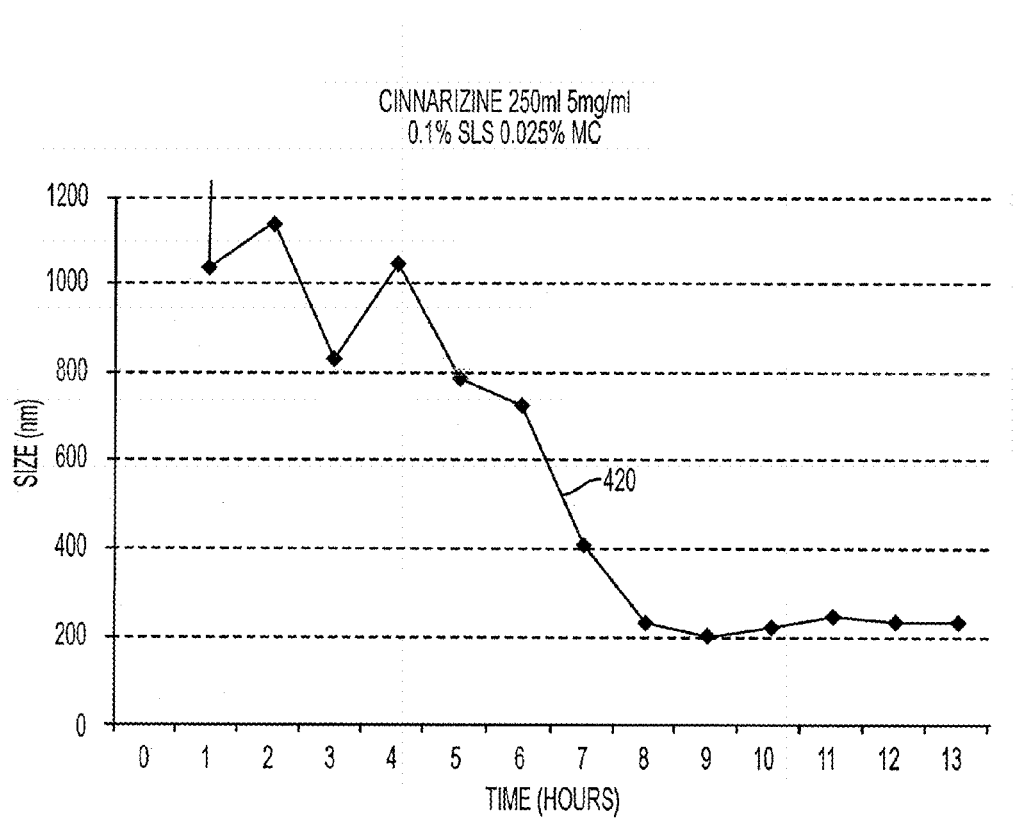
FIG. 8 illustrates a graph of average particle size over time during treatment of a mixture in accordance with another example.

The Cinnarizine suspension mixture was increased to 250 mL, in a similar fashion to that of the scaled up Ibuprofen suspension. The suspension mixture included water, 0.025% methyl cellulose and 0.1% sodium lauryl sulfate, being well below the critical micelle concentration range. FIG. 8 illustrates a graph of the particle size reduction according to a curve 420 for the Cinnarizine suspension over time. The starting average particle size was approximately 200 microns. Following 1 hour of processing for the 250 mL suspension, a 1 micron average particle size was achieved. By about 9 hours time, the average particle size stabilized at approximately 200 nm.

Example 2

Figure 9:
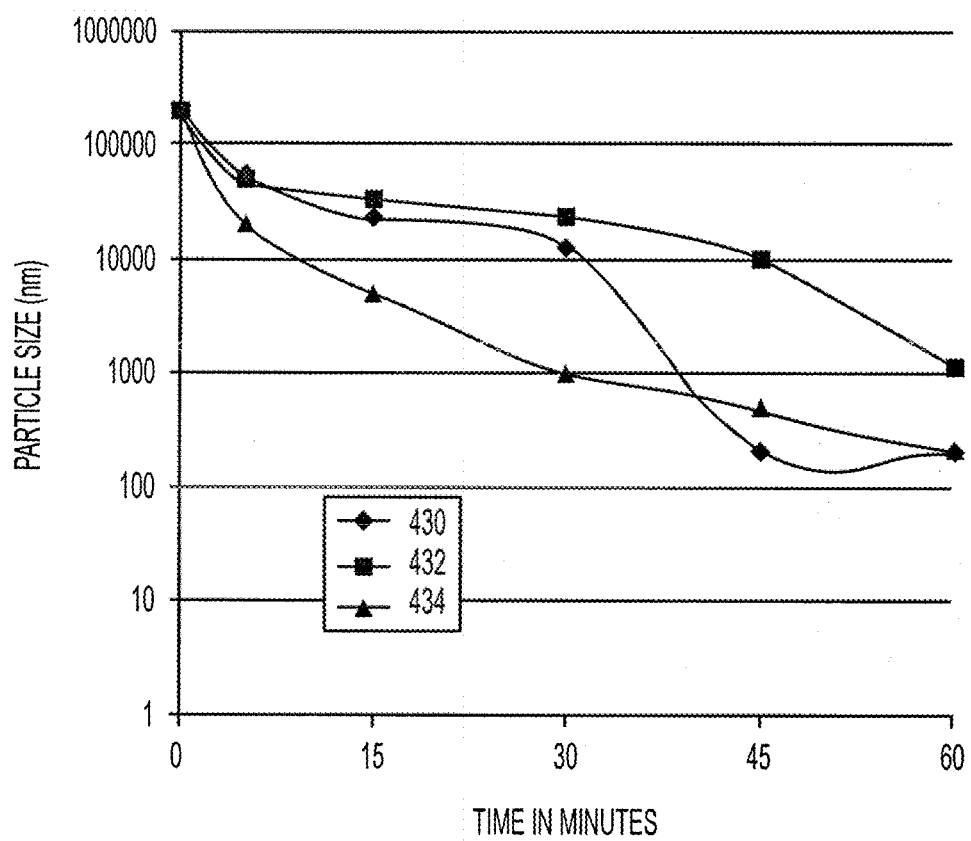
FIG. 9 depicts a graph of average particle size over time during treatment of a mixture in accordance with an example.

FIG. 9 depicts a graph of particle size reduction according to curves 430, 432, 434 over time. Curve 430 refers to material D15, curve 432 refers to material Z27 and curve 434 refers to material K19.

Example 3

Figure 10:
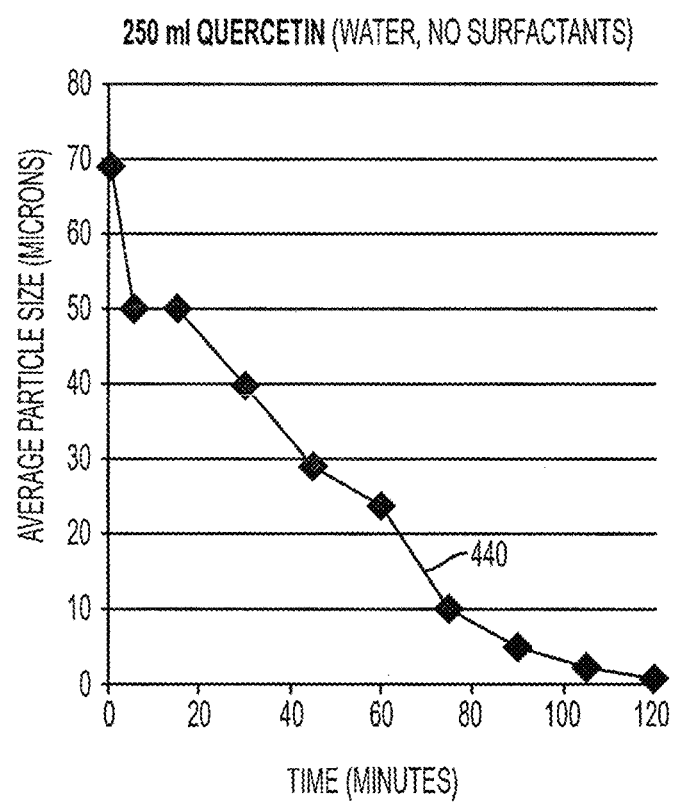
FIG. 10 illustrates a graph of average particle size over time during treatment of a mixture in accordance with an example.

A scaled up 250 mL sample of Quercetin in water with no surfactant was subject to a focused acoustic field. FIG. 10 illustrates a graph of the particle size reduction along curve 440, showing a reduction of the average particle size from over 200 microns to less than 10 microns in under 80 minutes. The temperature of the sample was controlled at 24 degrees C. during focused acoustic processing.

Example 4

A mixture of Indomethacin in water was subject to focused acoustic treatment.

Figure 11:
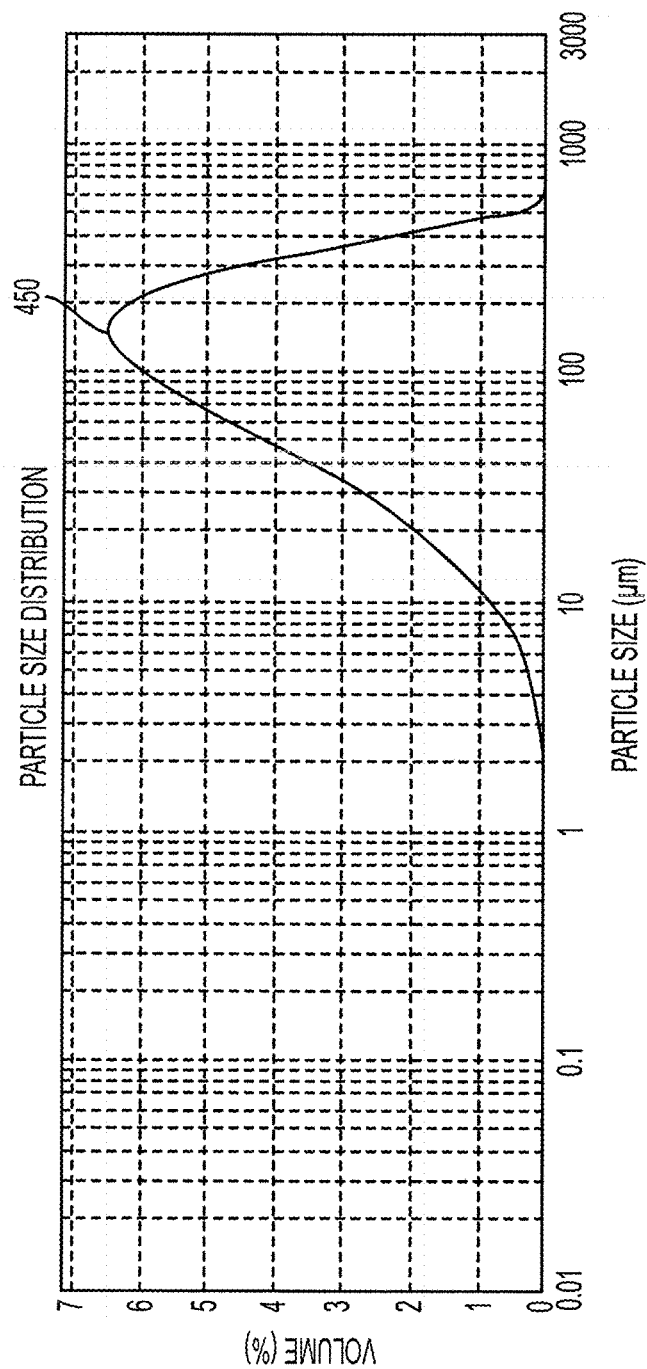
FIG. 11 shows a graph of the particle size distribution of a mixture in accordance with yet another example.
Figure 12:
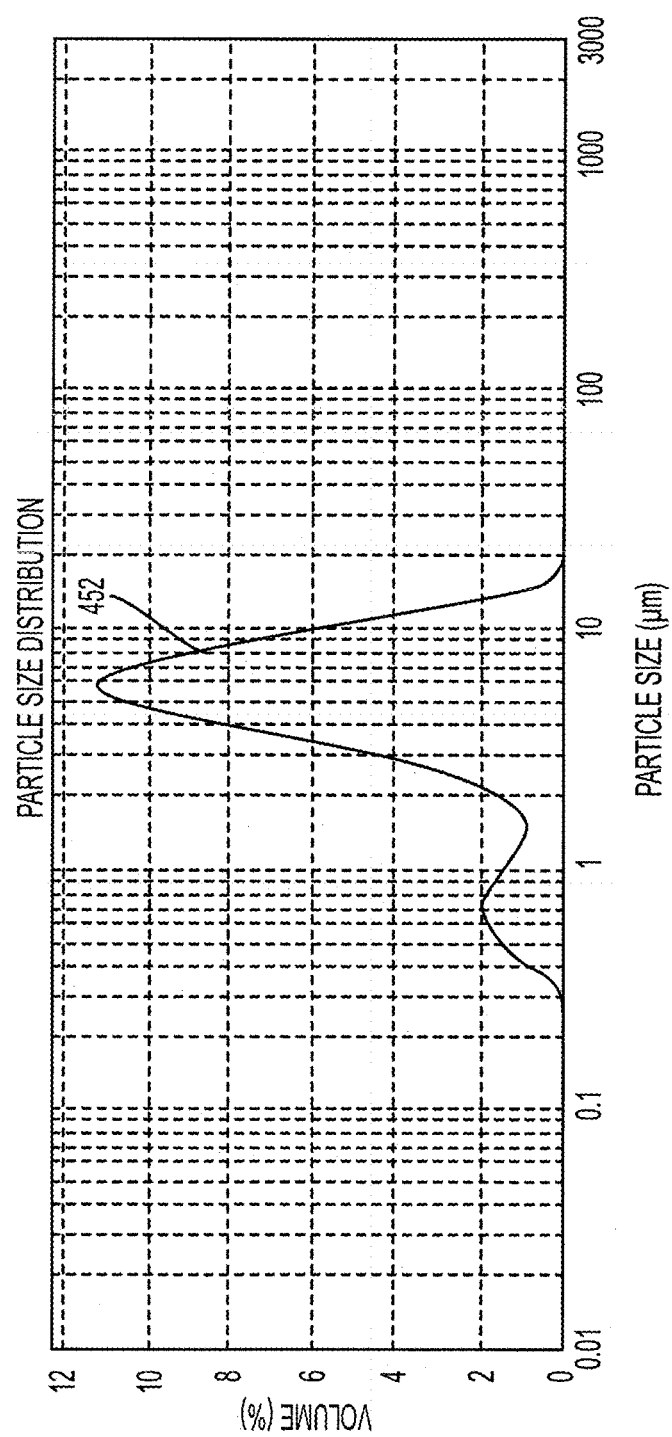
FIG. 12 shows a graph of the particle size distribution of a mixture in accordance with a different example.

According to the distribution curve 450 of FIG. 11, the average particle size prior to exposure to focused acoustic energy was between 100 and 200 microns. FIG. 12 depicts a distribution curve 452 after exposure of the mixture to the focused acoustic energy, showing the average particle size to be approximately 5 microns.

Example 5

Solutol HS 15 (a nonionic solubilizer) was mixed with oil and water to create a nano-emulsion blank. A volume of 250 mL was processed to demonstrate scalability.

Figure 13:
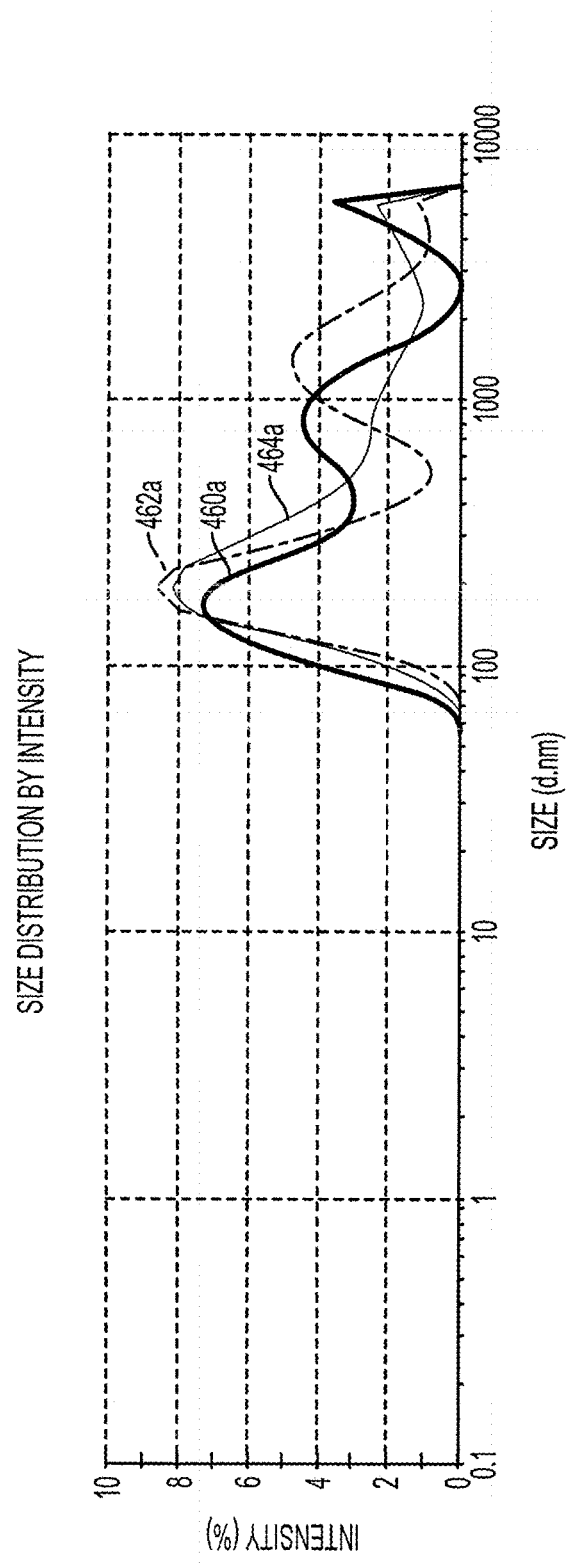
FIG. 13 illustrates a graph of the particle size distribution of a mixture in accordance with an example prior to treatment.

FIG. 13 illustrates three different distributions 460a, 462a, 464a of the nano-emulsion, exhibiting significant polydispersity. The mixture was then heated to 50 degrees C. and subjected to focused acoustic processing at 160 Watts for 5 minutes.

Figure 14:
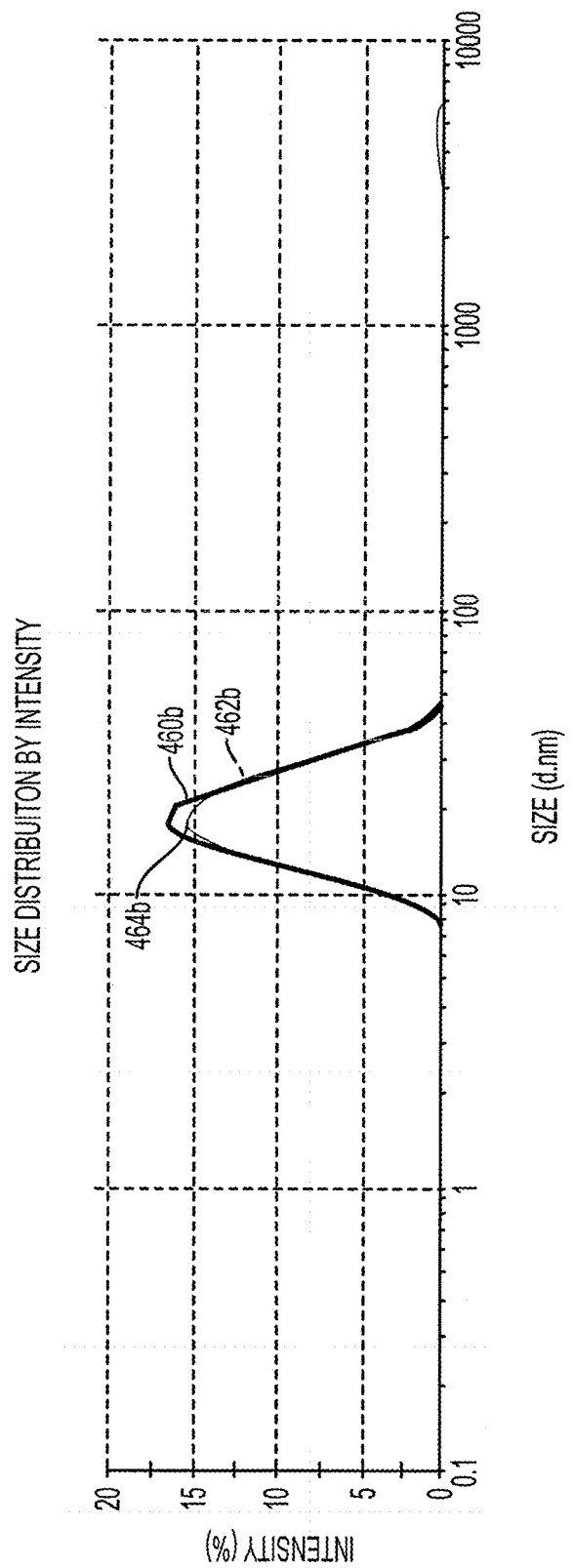
FIG. 14 illustrates a graph of the particle size distribution of a mixture in accordance with the example of FIG. 13 after focused acoustic treatment.

FIG. 14 shows the particle size distributions 460b, 462b, 464b resulting from the focused acoustic treatment. Each of the nano-emulsions were observed to be monodisperse having a mean particle size of 20.27 nm.

Figure 15:
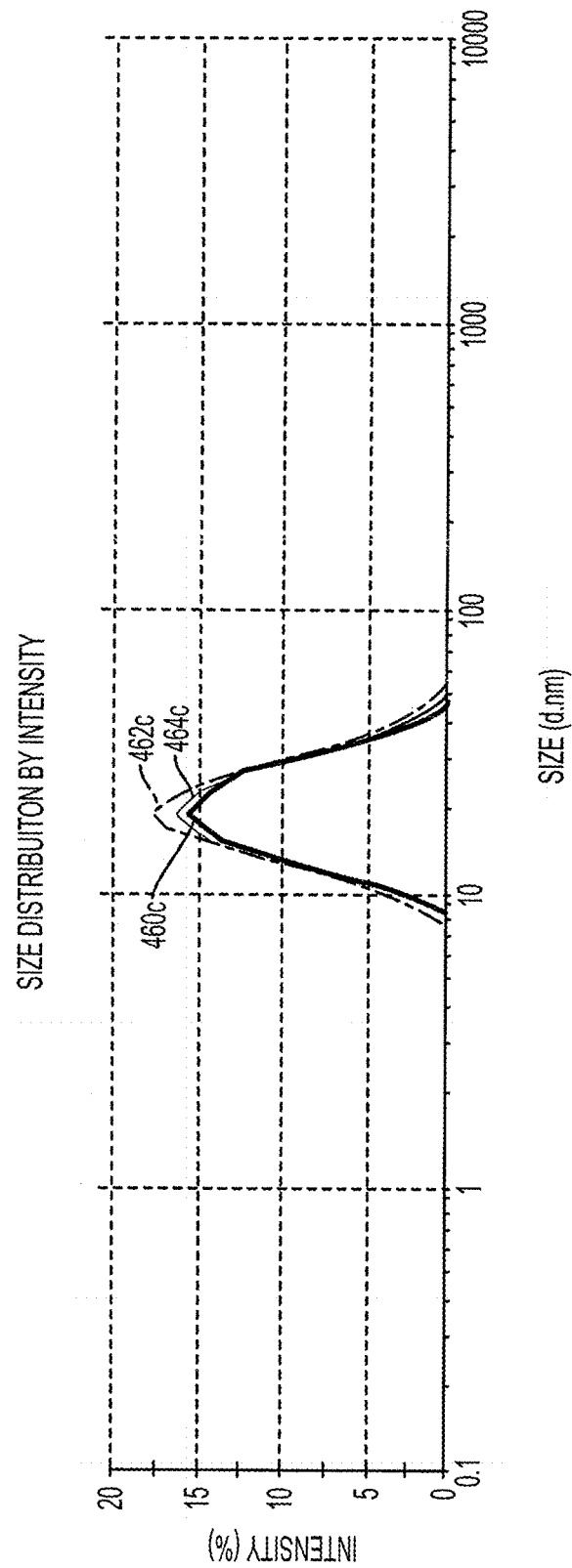
FIG. 15 illustrates another graph of the particle size distribution of a mixture in accordance with the example of FIG. 13 after focused acoustic treatment.

FIG. 15 depicts the particle size distributions 460c, 462c, 464c of the nano-emulsions after allowed to stand for a 24 hour time period. The particles were observed to remain stable having a mean particle size of 19.62 nm.

Example 6

Focused acoustics-based liposome formation has been demonstrated not to degrade biological materials below a certain size. 2 mg of Phospholipon-90G (Lipoid LLC) was combined with in 130 microliters of deionized water, and 10-30 mg of Phospholipon-90G was combined with 2 mL of deionized water at 10 mg/mL. A focused acoustic field was applied to the mixture at 18 Watts (150 PIP, 10% duty cycle, 200 cycles per burst) and 150 watts (300 PIP, 50% duty cycle, 1000 cycles per burst), respectively, for 30 seconds while maintaining the mixture at a constant temperature of 4 degrees C.

Figure 16:
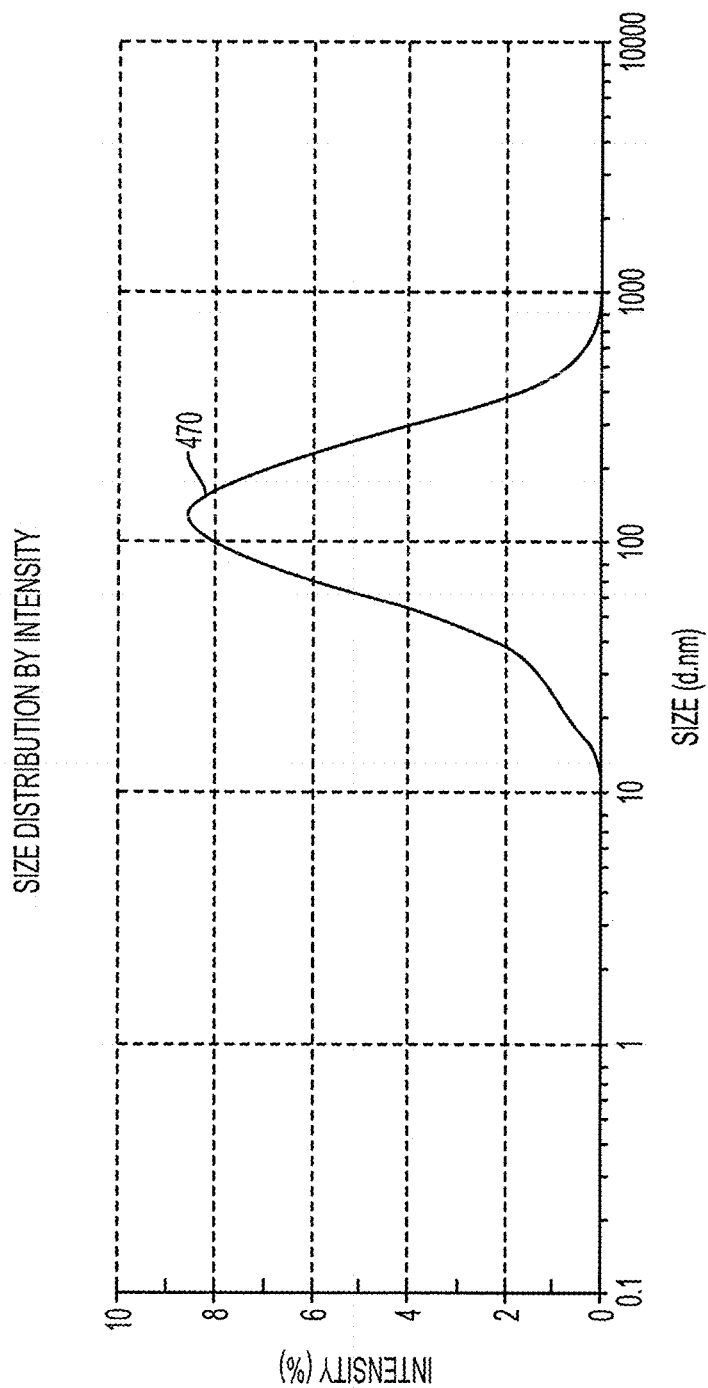
FIG. 16 depicts a graph of the particle size distribution of a mixture in accordance with an example.

FIG. 16 depicts the particle size distribution 470 of the nanoformulation. A monodisperse liposome population encapsulating DNA was formed with an average particle size of less than 100 nm. To evaluate stability, the nanoformulation was allowed to stand for 1 week in laboratory conditions and was then retested for particle size.

Figure 17:
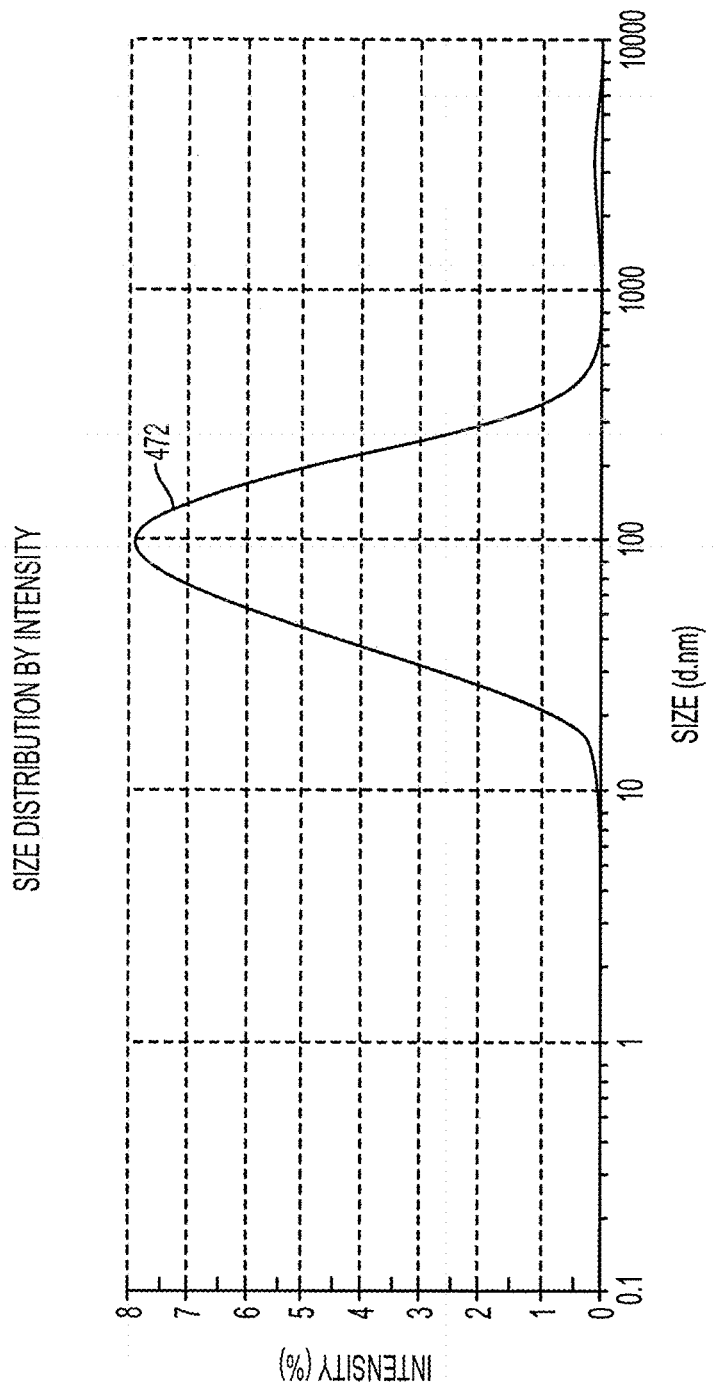
FIG. 17 depicts a graph of the particle size distribution of a mixture in accordance with another example.

FIG. 17 shows the particle size distribution 472 of the nanoformulation after a 1 week time period. The average particle size remained below 100 nm.

The above processing conditions were tested to determine effects on DNA size. A DNA strand of 100 bp was used as a starting material and subjected to focused acoustic processing levels consistent with those required for liposome formation. Under the dosage of focused acoustics, the 100 bp DNA material showed no signs of degradation and remained fully intact. This example shows that polynucleotide strands having a length of about 100 bp or more (or less) are not damaged using focused acoustic processing conditions and are encapsulated. This example also demonstrates the ability to create nanoformulations with particles having a diameter or other size between approximately 10 nanometers and approximately 400 nanometers that include siRNA or other polynucleotides without significant degradation of the polynucleotides.

Example 7

A suitable oil and surfactant were mixed together with a bio-active ingredient (active ingredient) and DI water. The mixture was then subjected to focused acoustic energy produced by an acoustic processing apparatus sold by Covaris, Inc. of Woburn, Mass., at high intensity (10%), with a duty cycle of 20-50, and Cycles per burst of about 200. This treatment was found to create nano-emulsions having oil particles ranging in size from about 10-400 nm, where each oil particle included the bio-active ingredient and was suspended in the DI water carrier. Some of the formulations created by certain conditions of AFA and combinations of Soybean oil and Tween-80 are represented in Tables 7-12 to show the influence of the AFA technology on the emulsions. Very low concentrations of Tween-80 and Oil (such as that shown in Table 7) were not successful in producing nano-emulsions with desired properties irrespective of time exposure of AFA energy. Table 8, at conditions involving 10 minutes of exposure, shows the effect of AFA energy. Table 9, at conditions involving both 5 and 10 minutes exposure to AFA energy, shows the effect on the formulation of the initial mixture. In Table 10, ample effect is shown on the formulations at 5 and 10 minutes exposure to AFA energy. Table 11, at run times of 15, 30, 40 and 60 minutes, showed promise for further analysis and development of nano-emulsions because the mixture formulation and acoustic energy conditions produced nanoemulsions that included a fairly narrow particle size range, e.g., including almost 87% of the particles have a 260 nm size. At 15 minutes exposure a maximum effect of the combinations was created.

TABLE 6

| Technology | AFA | MFT | SANE | SONICATION |
|---|---|---|---|---|
| Heat | Room temp or 20 C. | 50-100 C. | 60-100 C. | Based on time of exposure and power of sonication |
| Labor | Meagre | high | high | high |
| Wastage | Meagre | High | Medium | Medium |
| End product | Homogenous | Homogenous | Homogenous | No |
| Pressure | NO | High 24000-28000 psi | NO | Based on the time/power of procedure |
| Closed vial Process | YES | NO | NO | NO |
| Cross contamination/ Contamination | NO | YES | YES | YES |
| Isothermal Processing | YES | NO | NO | NO |
| Precise Energy Control | YES | NO | NO | NO |
| Non Contact processing | YES | NO | NO | NO |
| Heat damage to sample | NO | YES | YES | Can't say |
| Repeatable without error | YES | NO | NO | NO |
| Self Sterilizing | YES | NO | NO | NO |

TABLE 7

0.25 gm Soybean oil + 0.25 gm Tween80 + 19.5 ml DI water.

| | 0 minute | 1 minute | 5 minute | 10 minute |
|---|---|---|---|---|
| Sizep1 | Out of range | Out of range | Out of range | Out of range |
| % Intensity | Out of range | Out of range | Out of range | Out of range |
| Sizep2 | Out of range | Out of range | Out of range | Out of range |
| % Intensity | Out of range | Out of range | Out of range | Out of range |
| Sizep3 | Out of range | Out of range | Out of range | Out of range |
| % Intensity | Out of range | Out of range | Out of range | Out of range |
| PdI | Out of range | Out of range | Out of range | Out of range |
| Quality Report | Bad | Bad | Bad | Bad |

TABLE 8

0.5 gm Soybean oil + 0.5 gm Tween80 + 19 ml DI water.

| | 0 minute | 1 minute | 5 minute | 10 minute |
|---|---|---|---|---|
| Sizep1 | Out of range | Out of range | Out of range | 821.5 |
| % Intensity | Out of range | Out of range | Out of range | 91 |
| Sizep2 | Out of range | Out of range | Out of range | 4848 |
| % Intensity | Out of range | Out of range | Out of range | 7.7 |
| Sizep3 | Out of range | Out of range | Out of range | 120 |
| % Intensity | Out of range | Out of range | Out of range | 1.4 |
| PdI | Out of range | Out of range | Out of range | 0.425 |
| Quality Report | Bad | Bad | Bad | Good |

TABLE 9

1 gm Soybean oil + 1 gm Tween80 + 18 ml DI water.

| | 0 minute | 1 minute | 5 minute | 10 minute |
|---|---|---|---|---|
| Sizep1 | Out of range | Out of range | 631.5 | 1106.0 |
| % Intensity | Out of range | Out of range | 98.4% | 49.4% |
| Sizep2 | Out of range | Out of range | 4602.0 | 249.9 |
| % Intensity | Out of range | Out of range | 1.6% | 38.6% |
| Sizep3 | Out of range | Out of range | 0 | 4567 |
| % Intensity | Out of range | Out of range | 0 | 11.9% |
| PdI | Out of range | Out of range | 0.401 | >0.542 |
| Quality Report | Bad | Bad | Good | Rely on distribution analysis |

TABLE 10

1 gm Soybean oil + 2 gm Tween80 + 17 ml DI water.

| | 0 minute | 1 minute | 5 minute | 10 minute |
|---|---|---|---|---|
| Sizep1 | Out of range | Out of range | 270.7 | 260.1 |
| % Intensity | Out of range | Out of range | 59.8% | 86.5% |
| Sizep2 | Out of range | Out of range | 2080 | 3657 |
| % Intensity | Out of range | Out of range | 40.2% | 8.3% |
| Sizep3 | Out of range | Out of range | 0 | 1432 |
| % Intensity | Out of range | Out of range | 0 | 5.2% |
| PdI | Out of range | Out of range | 0.488 | 0.367 |
| Quality Report | Bad | Bad | Good | Good |

TABLE 11

1 gm Soybean oil + 2 gm Tween80 + 17 ml DI water.

| | 15 minute | 30 minute | 40 minute | 60 minute |
|---|---|---|---|---|
| Size p1 | 1184 | 1373 | 371.7 | 512.4 |
| % Intensity | 50.8 | 53.2 | 98.5 | 100 |
| Size p2 | 246 | 241.5 | 4815 | 0 |
| % Intensity | 49.2 | 46.8 | 1.5 | 0 |
| Size p3 | 0 | 0 | 0 | 0 |
| % Intensity | 0 | 0 | 0 | 0 |
| PdI | 0.439 | 0.482 | 0.213 | 0.307 |
| Quality Report | Good | Good | Good | Good |

TABLE 12

1 gm Soybean oil + 2 gm Tween80 + 17 ml DI water 10% INTENSITY.

| | Minutes | | | | | | |
|---|---|---|---|---|---|---|---|
| | 1 | 5 | 10 | 15 | 30 | 40 | 60 |
| Size p1 | 2011 | 1186 | 262.3 | 340 | 363.6 | 295.4 | 383.5 |
| % Intensity | 61.9 | 51.6 | 76.2 | 98.1 | 93.2 | 72.3 | 96.2 |
| Size p2 | 186.7 | 243.4 | 1499 | 5021 | 4227 | 2222 | 5042 |
| % Intensity | 38.1 | 48.4 | 23.8 | 1.9 | 6.8 | 27.7 | 3.8% |
| Size p3 | 0 | 0 | 0 | 0 | 0 | 0 | 0 |
| % Intensity | 0 | 0 | 0 | 0 | 0 | 0 | 0 |
| PdI | 0.908 | 0.495 | 0.412 | 0.257 | 0.264 | 0.452 | 0.297 |
| Quality Report | Bad | Good | Good | Good | Good | Good | Good |

Example 8

Gold nanoparticles are prepared where 10 mL of 1 mM HAuCl4 were added into 25 mL vial on a stirring hot plate. The solution was stirred while processing with focused acoustics. 1 mL of a 1% solution of tri-sodium citrate dehydrate was added to the solution during acoustic processing. The added citrate was found to slowly reduce the gold salt to metallic gold and at the same time act as a ligand capping group forming nano-crystals of gold. Accordingly, focused acoustics may be used to enhance the synthesis during the formation of nanocrystals such as Gold, Iron Oxide, drugs.

It is to be understood that the invention is not limited in its application to the details of construction and the arrangement of components set forth in the following description or illustrated in the drawings. Other embodiments and manners of carrying out the invention are possible. The phraseology and terminology used herein is for the purpose of description and should not be regarded as limiting. The use of "including," "comprising," or "having" and variations thereof is meant to encompass the items listed thereafter and equivalents thereof as well as additional items. Having thus described various illustrative embodiments and aspects thereof, modifications and alterations may be apparent to those of skill in the art. Such modifications and alterations are intended to be included in this disclosure, which is for the purpose of illustration only, and is not intended to be limiting. The scope of the invention should be determined from proper construction of the appended claims, and their equivalents.

What is claimed is:

1. A method of preparing an emulsion or liposome-containing formulation, comprising:
   providing a mixture in a vessel, the mixture comprising a first composition and a second composition;
   transmitting focused acoustic energy having a frequency of between about 100 kilohertz and about 100 megahertz and a focal zone through a wall of the vessel such that the mixture is disposed at least partially in the focal zone;
   sensing characteristics of the mixture and adjusting cycles per burst of the focused acoustic energy based on the sensed characteristics of the mixture to achieve a desired particle size of the emulsion or liposome-containing formulation created by exposing the mixture to the focused acoustic energy; and
   forming a plurality of particles in the mixture to create the emulsion or liposome-containing formulation by, at least in part, exposure of the mixture to the focal zone of the focused acoustic energy having the adjusted cycles per burst, a plurality of liquid particles in the emulsion or plurality of liposome particles in the liposome-containing formulation having an average size of between approximately 10 nm and approximately 400 nm after exposure of the mixture to the focal zone.

2. The method of claim 1, wherein the plurality of particles resulting from exposure of the mixture to the focal zone have an average size of between approximately 20 nm and approximately 100 nm.

3. The method of claim 1, wherein the mixture comprises a volume of between about 1 mL and about 300 mL and a concentration of the first composition in the mixture is between approximately 1 mg/mL and approximately 100 mg/mL of the mixture.

4. The method of claim 1, wherein transmitting focused acoustic energy to expose the mixture to the focal zone comprises operating an acoustic energy source to produce a unimodal distribution of the plurality of particles in the mixture.

5. The method of claim 1, wherein transmitting focused acoustic energy to expose the mixture to the focal zone comprises operating an acoustic energy source to produce a polydispersity index of less than 0.1.

6. The method of claim 5, wherein transmitting focused acoustic energy to expose the mixture to the focal zone comprises operating an acoustic energy source to produce a polydispersity index of between 0.05 and 0.1.

7. The method of claim 1, wherein the first composition comprises a bioactive drug including at least one of a therapeutic agent, or a polynucleotide material, or a plasmid.

8. The method of claim 7, wherein the second composition comprises a surfactant.

9. The method of claim 8, wherein the surfactant comprises sodium lauryl sulfate.

10. The method of claim 1, wherein transmitting focused acoustic energy to expose the mixture to the focal zone comprises exposing the mixture to an isothermal environment.

11. The method of claim 1, wherein the plurality of particles comprise a hydrophilic liquid material or a hydrophobic liquid material containing an active ingredient, each particle having a size between approximately 10 nanometers and approximately 400 nanometers, and further comprising a carrier that suspends the particles, the carrier including a liquid having a hydrophilicity that is opposite that of the particles.

12. The method of claim 11, wherein the formulation lacks particles having a size larger than approximately 400 nanometers or smaller than approximately 10 nanometers.

13. The method of claim 11, wherein the formulation exhibits longer shelf life than formulations created via other processes.

14. The method of claim 11, wherein the formulation exhibits minimal contamination levels than formulations created via other processes, or wherein said formulation is sterile.

15. The method of claim 11, wherein the particles are each a droplet of hydrophobic material that is suspended in a hydrophilic carrier liquid.

16. The method of claim 11, wherein the particles are each a droplet of hydrophilic material that is suspended in a hydrophobic carrier liquid.

17. The method of claim 11, wherein the active ingredient is a pharmaceutical, nutraceutical, or cosmeceutical.

18. The method of claim 11, wherein the mixture comprises a liquid dispersion medium and a liquid carrier, wherein said active ingredient optionally has a solubility greater than 3 mg/ml in said medium.

19. The method of claim 18, wherein the liquid dispersion medium is hydrophobic and the liquid carrier is hydrophilic.

20. The method of claim 18, wherein the liquid dispersion medium is hydrophilic and the liquid carrier is hydrophobic.

21. The method of claim 18, wherein the dispersion medium is selected from the group consisting of aqueous media and oil-based media.

22. The method of claim 18, wherein the dispersion medium is an oil-based media selected from the group including saturated and unsaturated oils from vegetable and marine sources, silicone oils, mineral oils, and plant-derived oils.

23. The method of claim 1, wherein the mixture includes a polynucleotide material, a lipid and a carrier, and after exposure of the mixture to the focused acoustic energy, the lipid and polynucleotide material form liposomes in the carrier and the carrier is substantially devoid of polynucleotide material.

24. The method of claim 23, the polynucleotide material has a size of less than 1000 bp.

25. The method of claim 1, wherein the step of forming a plurality of particles includes creating a liposome-containing formulation, and the mixture includes water and no organic solvent.

26. A method of preparing a liposome-containing formulation, comprising:
providing a mixture in a vessel, the mixture comprising a lipid, an active ingredient to be encapsulated by the lipid and an aqueous solution with no organic solvent;
transmitting focused acoustic energy having a frequency of between about 100 kilohertz and about 100 megahertz and a focal zone through a wall of the vessel such that the mixture is disposed at least partially in the focal zone;
sensing characteristics of the mixture and adjusting cycles per burst of the focused acoustic energy based on the sensed characteristics of the mixture to achieve a desired particle size of liposomes in the liposome-containing formulation created by exposing the mixture to the focused acoustic energy; and
forming a plurality of liposomes in the mixture to create the liposome-containing formulation by, at least in part, exposure of the mixture to the focal zone of the focused acoustic energy having the adjusted cycles per burst, the plurality of liposomes in the liposome-containing formulation having an average size of between approximately 10 nm and approximately 400 nm after exposure of the mixture to the focal zone.

27. The method of claim 26, wherein the step of forming includes maintaining the mixture within 5 degrees C. of a starting temperature of the mixture before the mixture is exposed to acoustic energy.

28. The method of claim 26, wherein step of forming includes maintaining the mixture within 5 degrees C. of 4 degrees C.

29. The method of claim 26, wherein the step of forming includes sterilizing the mixture.

30. The method of claim 26, wherein the one or more parameters includes a period of time that the mixture is exposed to the focused acoustic energy.

31. The method of claim 26, wherein the active ingredient includes polynucleotide material.

* * * * *